US008189928B2

(12) United States Patent
Gotoh et al.

(10) Patent No.: US 8,189,928 B2
(45) Date of Patent: May 29, 2012

(54) CONTENT MANAGEMENT APPARATUS, IMAGE DISPLAY APPARATUS, IMAGE PICKUP APPARATUS, PROCESSING METHOD AND PROGRAM FOR CAUSING COMPUTER TO EXECUTE PROCESSING METHOD

(75) Inventors: Tomohiko Gotoh, Kanagawa (JP); Tamaki Kojima, Kanagawa (JP); Osamu Hanagata, Tokyo (JP); Tsunayuki Ohwa, Kanagawa (JP)

(73) Assignee: Sony Corporation (JP)

( * ) Notice: Subject to any disclaimer, the term of this patent is extended or adjusted under 35 U.S.C. 154(b) by 1070 days.

(21) Appl. No.: 12/079,187

(22) Filed: Mar. 25, 2008

(65) Prior Publication Data

US 2008/0253663 A1   Oct. 16, 2008

(30) Foreign Application Priority Data

Mar. 30, 2007   (JP) .............................. P2007-090220

(51) Int. Cl.
*G06K 9/36* (2006.01)

(52) U.S. Cl. ....................................................... 382/225

(58) Field of Classification Search .................. None
See application file for complete search history.

(56) References Cited

U.S. PATENT DOCUMENTS

| 2006/0203012 | A1 | 9/2006 | Nakajima |
| 2006/0282443 | A1* | 12/2006 | Hanagata ....................... 707/100 |
| 2007/0271297 | A1* | 11/2007 | Jaffe et al. ................... 707/104.1 |

FOREIGN PATENT DOCUMENTS

| JP | 2001-228528 A | 8/2001 |
| JP | 2006-285964 A | 10/2006 |
| JP | 2006-330988 A | 12/2006 |
| JP | 2006-344005 A | 12/2006 |

OTHER PUBLICATIONS

Ester, et al., A Density-Based Algorithm for Discovering Clusters in Large Spatial Databases with Noise, Institute for Computer Science, University of Munich.

* cited by examiner

*Primary Examiner* — Brian P Werner
(74) *Attorney, Agent, or Firm* — Lerner, David, Littenberg, Krumholz & Mentlik, LLP

(57) ABSTRACT

Disclosed herein is a content management apparatus, including: content inputting means for inputting a content with which position information is associated; position information acquisition means for acquiring the position information associated with the content inputted by the content inputting means; tree production means for producing binary tree structure data corresponding to a binary tree having leaves to which contents inputted by the content inputting means correspond based on the position information of the contents acquired by the position information acquisition means; and determination means for extracting a node which satisfies a predetermined condition from among nodes of the binary tree structure data produced by the tree production means and determining those of the contents which belong to the extracted node as one group.

13 Claims, 41 Drawing Sheets

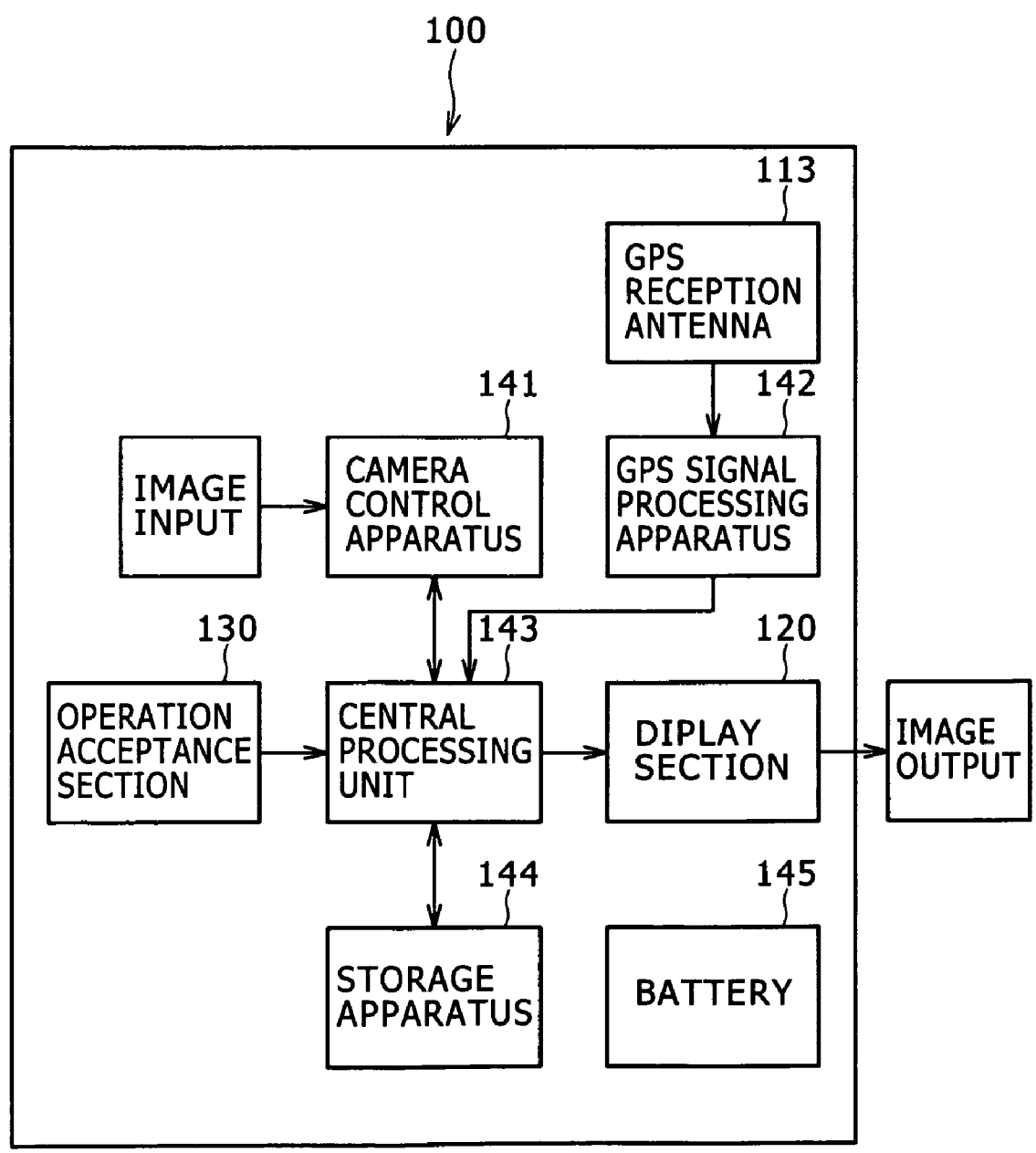

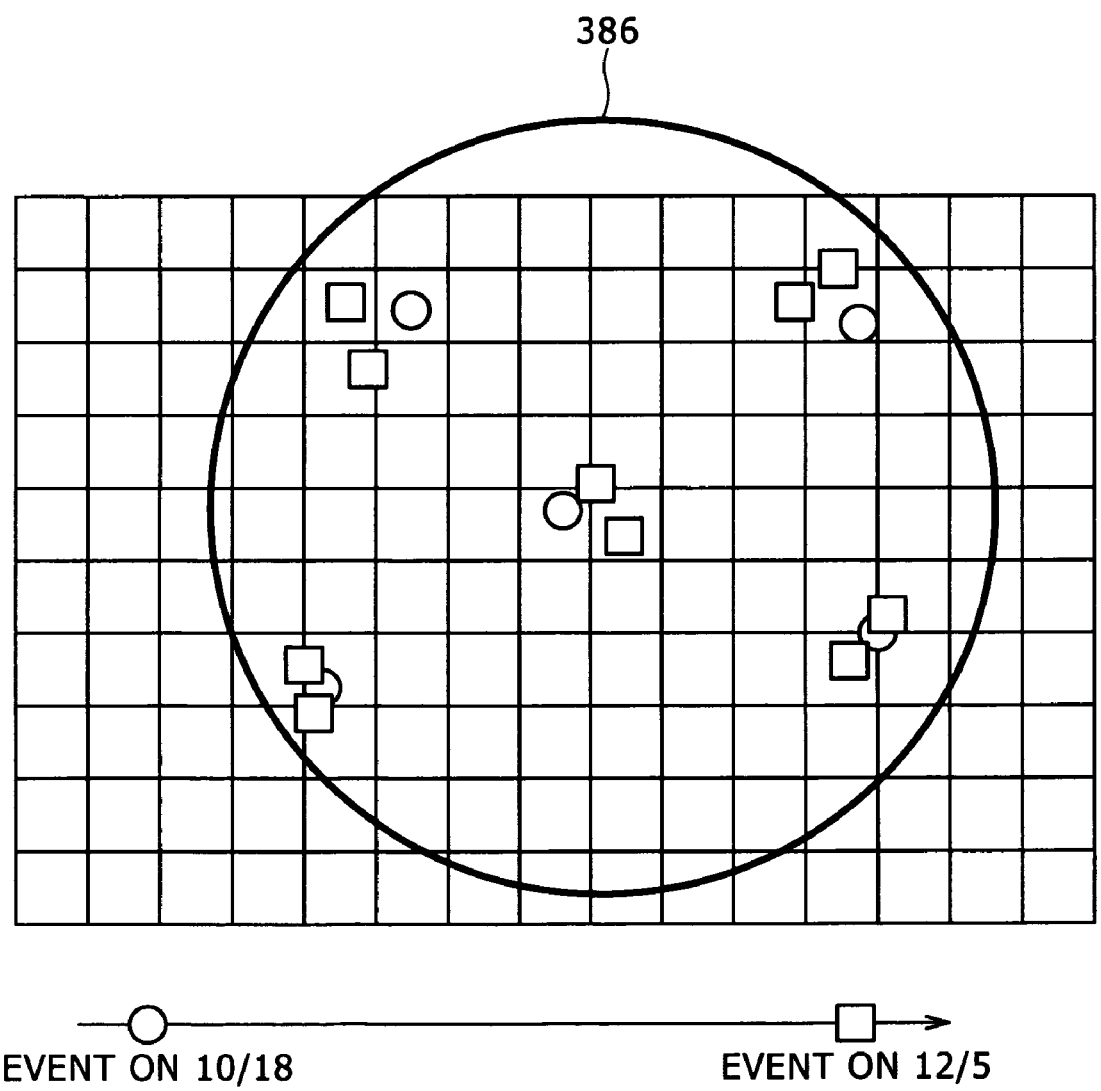

CLUSTER SIZE
SMALL ←————————————————→ GREAT

DENSITY OF CONTENTS
HIGH ←————————————————→ LOW

EVENT NUMBER
GREAT ←————————————————→ SMALL

| CLUSTER NUMBER | r | cx | cy |
|---|---|---|---|
| 0 | 0 | 0 | 0 |
| 1 | 0 | 10 | 0 |
| 2 | 0 | 35 | 0 |
| 3 | 0 | 51 | 0 |
| 4 | 0 | 50 | 80 |
| 5 | 0 | 50 | 60 |
| 6 | 0 | 90 | 50 |
| 7 | 0 | 90 | 20 |

| CLUSTER NUMBER | r | cx | cy |
|---|---|---|---|
| 0 | 5 | 5 | 0 |
| 2 | 0 | 35 | 0 |
| 3 | 0 | 51 | 0 |
| 4 | 0 | 50 | 80 |
| 5 | 0 | 50 | 60 |
| 6 | 0 | 90 | 50 |
| 7 | 0 | 90 | 20 |

| CLUSTER NUMBER | r | cx | cy |
|---|---|---|---|
| 0 | 5 | 5 | 0 |
| 2 | 8 | 43 | 0 |
| 4 | 0 | 50 | 80 |
| 5 | 0 | 50 | 60 |
| 6 | 0 | 90 | 50 |
| 7 | 0 | 90 | 20 |

| CLUSTER NUMBER | r | cx | cy |
|---|---|---|---|
| 0 | 5 | 5 | 0 |
| 2 | 8 | 43 | 0 |
| 4 | 10 | 50 | 70 |
| 6 | 0 | 90 | 50 |
| 7 | 0 | 90 | 20 |

| CLUSTER NUMBER | r | cx | cy |
|---|---|---|---|
| 0 | 25.5 | 25.5 | 0 |
| 4 | 10 | 50 | 70 |
| 6 | 0 | 90 | 50 |
| 7 | 0 | 90 | 20 |

| CLUSTER NUMBER | r | cx | cy |
|---|---|---|---|
| 0 | 25.5 | 25.5 | 0 |
| 4 | 10 | 50 | 70 |
| 6 | 15 | 90 | 35 |

| CLUSTER NUMBER | r | cx | cy |
|---|---|---|---|
| 0 | 25.5 | 25.5 | 0 |
| 4 | 39.0754 | 71.8814 | 50.8537 |

| CLUSTER NUMBER | r | cx | cy |
|---|---|---|---|
| 0 | 66.7019 | 53.2647 | 30.4419 |

434

CONTENT MANAGEMENT APPARATUS, IMAGE DISPLAY APPARATUS, IMAGE PICKUP APPARATUS, PROCESSING METHOD AND PROGRAM FOR CAUSING COMPUTER TO EXECUTE PROCESSING METHOD

CROSS-REFERENCE TO RELATED APPLICATIONS

The present application claims priority from Japanese Patent Application No. JP 2007-090220, filed in the Japanese Patent Office on Mar. 30, 2007, the entire content of which is incorporated herein by reference.

BACKGROUND OF THE INVENTION

1. Field of the Invention

This invention relates to a content management apparatus, and more particularly to a content management apparatus, an image display apparatus, an image pickup apparatus and a processing method which classify and manage a plurality of contents and a program for causing a computer to execute the processing method.

2. Description of the Related Art

In the past, a very great number of proposals have been made for a search technique for arranging contents such as still pictures picked up by a digital still camera or moving pictures picked up by a digital video camera and a display technique for accessing such contents.

Also a technique is known wherein picked up images and pickup positions or pickup time at which the picked up images are picked up are stored in an associated relationship with each other such that, when a picked up image is to be searched for, the stored pickup positions or pickup time is used to search for the desired picked up image.

For example, an image outputting apparatus of the type described is known and disclosed, for example, in Japanese Patent Laid-Open No. 2006-285964 (refer to FIG. 4). According to the image outputting apparatus, a plurality of picked up images and image pickup positions of the picked up images are stored in an associated relationship with each other. Then, if an instruction is issued by a user to display one of the stored picked up images, then an object range including the designated picked up image is set based on the distance between the pickup position corresponding to the designated picked up image and the position at present at which the instruction is issued by the user. Then, those picked up images which are included in the object range are displayed. The object range is set so as to increase as the difference between the pickup position and the position at present increases.

SUMMARY OF THE INVENTION

In the image outputting apparatus, picked up images are classified based on position information thereof and position information of a reference position of the user. For example, if the reference position is set to the user's own home, then a comparatively small object region is set for images picked up at places near to the user's own home, but a comparatively great object region is set for images picked up at places far from the user's own home. Therefore, picked up images picked up at places which are near to the user's own home and are visited frequently by the user are classified individually for small areas whereas picked up images picked up at such far places as are visited on a journey or the like are classified individually for great areas.

However, some place may be visited frequently although it is far from the user's own home, and the user may possibly want to classify picked up images picked up at the place for comparatively small areas. However, with the image outputting apparatus described above, it is difficult to reflect such various likings of the user on the classification because picked up images are classified based on the distance from the position information of the reference position of the user.

However, it is considered that, if contents such as picked up images can be classified in accordance with the liking of the user, then the user can enjoy the contents more favorably.

Therefore, it is desirable to provide a content management apparatus, an image display apparatus, an image pickup apparatus, a processing method and a program by which contents can be classified appropriately in accordance with the liking of the user.

According to an embodiment of the present invention, there is provided a content management apparatus including content inputting means for inputting a content with which position information is associated, position information acquisition means for acquiring the position information associated with the content inputted by the content inputting means, tree production means for producing binary tree structure data corresponding to a binary tree having leaves to which contents inputted by the content inputting means correspond based on the position information of the contents acquired by the position information acquisition means, and determination means for extracting a node which satisfies a predetermined condition from among nodes of the binary tree structure data produced by the tree production means and determining those of the contents which belong to the extracted node as one group.

According to another embodiment of the present invention, there is provided a content management method including the steps of inputting a content with which position information is associated, acquiring the position information associated with the content inputted at the content inputting step, producing binary tree structure data corresponding to a binary tree having leaves to which contents inputted at the content inputting step correspond based on the position information of the contents acquired at the position information acquisition step, and extracting a node which satisfies a predetermined condition from among nodes of the binary tree structure data produced at the tree production step and determining those of the contents which belong to the extracted node as one group.

According to a further embodiment of the present invention, there is provided a program for causing a computer to execute the steps of inputting a content with which position information is associated, acquiring the position information associated with the content inputted at the content inputting step, producing binary tree structure data corresponding to a binary tree having leaves to which contents inputted at the content inputting step correspond based on the position information of the contents acquired at the position information acquisition step, and extracting a node which satisfies a predetermined condition from among nodes of the binary tree structure data produced at the tree production step and determining those of the contents which belong to the extracted node as one group.

In the content management apparatus and method and the program, position information of an inputted content is acquired, and binary tree structure data wherein individual contents correspond to leaves of a binary tree are produced based on the acquired position information. Then, from among nodes of the thus produced binary tree structure data, a node which satisfies a predetermined condition is extracted. Then, those contents which belong to the extracted node are determined as one group.

The content management apparatus may further include condition setting means for changeably setting the predetermined condition. In the content management apparatus, the predetermined condition can be set changeably. In this instance, the content management apparatus may further include operation acceptance means for accepting an operation input, the condition setting means changing the set condition if an operation input to change the predetermined condition is accepted by the operation acceptance means, the determination means extracting the node of the produced binary tree structure data based on the condition changed by the condition setting means. In the content management apparatus, if an operation input to change the predetermined condition is accepted, then the set condition is changed, and the node of the produced binary tree structure data is extracted based on the changed condition.

The content management apparatus may be configured such that the predetermined condition is a parameter constant relating to the density of contents which belong to the node of the binary tree structure data, and the determination means calculates, for each of the nodes of the binary tree structure data, the density of contents in a cluster region which includes the contents which belong to the node and extracts that one of the nodes with regard to which the calculated density of clusters is included in a predetermined range defined by the parameter constant. In the content management apparatus, for each of the nodes of the binary tree structure data, the density of contents in a cluster region which includes the contents which belong to the node is calculated, and that one of the nodes with regard to which the calculated density of clusters is included in a predetermined range defined by the parameter constant is extracted. In this instance, the content management apparatus may be configured such that the parameter constant includes constants indicative of a lower limit value and an upper limit value to the density of clusters, and the determination means extracts those of the nodes with regard to which the calculated density of clusters is included in the range between the lower limit value and the upper limit value. In the content management apparatus, those of the nodes with regard to which the calculated density of clusters is included in the range between the lower limit value and the upper limit value are extracted.

The content management apparatus may be configured such that the predetermined condition is a parameter constant relating to the number of events of the contents which belong to each of the nodes of the produced binary tree structure data, and the determination means extracts, for each of the nodes of the binary tree structure data, the event number of the contents in a cluster region which includes the contents which belong to the node and extracts that one of the nodes with regard to which the calculated event number of the clusters is included in a predetermined range defined by the parameter constant. In the content management apparatus, for each of the nodes of the binary tree structure data, the event number of the contents in a cluster region corresponding to the node is calculated, and that one of the nodes with regard to which the calculated event number of the clusters is included in the predetermined range defined by the parameter constant is extracted. In this instance, the content management apparatus may be configured such that the parameter constant includes constants indicative of a lower limit value and an upper limit value to the event number of clusters, and the determination means extracts those of the nodes with regard to which the calculated event number of clusters is included in the range between the lower limit value and the upper limit value. In the content management apparatus, those of the nodes with regard to which the calculated event number of clusters is included in the range between the lower limit value and the upper limit value are extracted.

The content management apparatus may further include content outputting means for classifying and outputting the inputted content based on the determined group. In the content management apparatus, the inputted contents are classified and outputted based on the determined group.

The content management apparatus may be configured such that the content is an image content, the content management apparatus further including display control means for classifying the inputted image content based on the determined group and controlling a display section to display the inputted image content. In the content management apparatus, the inputted image content is classified based on the determined group, and the display section displays the inputted image content.

According to still further embodiment of the present invention, there is provided an image display apparatus including content inputting means for inputting an image content with which position information is associated, position information acquisition means for acquiring the position information associated with the image content inputted by the content inputting means, tree production means for producing binary tree structure data corresponding to a binary tree having leaves to which image contents inputted by the content inputting means correspond based on the position information of the image contents acquired by the position information acquisition means, determination means for extracting a node which satisfies a predetermined condition from among nodes of the binary tree structure data produced by the tree production means and determining those of the image contents which belong to the extracted node as one group, and display control means for classifying the inputted image content based on the determined group and controlling a display section to display the inputted image content. In the image display apparatus, position information of an inputted image content is acquired, and binary tree structure data corresponding to a binary tree having leaves to which inputted image contents correspond are produced based on the acquired position information of the image contents. Then, a node which satisfies the predetermined condition is extracted from among nodes of the produced binary tree structure data, and those of the image contents which belong to the extracted node are determined as one group. Then, the inputted image content is classified based on the determined group and displayed on the display section.

According to a yet further embodiment of the present invention, there is provided an image pickup apparatus including image pickup means for picking up an image of an image pickup object, content inputting means for inputting an image content which corresponds to the image picked up by the image pickup means and with which position information is associated, position information acquisition means for acquiring the position information associated with the image content inputted by the content inputting means, tree production means for producing binary tree structure data corresponding to a binary tree having leaves to which image contents inputted by the content inputting means correspond based on the position information of the image contents acquired by the position information acquisition means, determination means for extracting a node which satisfies a predetermined condition from among nodes of the binary tree structure data produced by the tree production means and determining those of the image contents which belong to the extracted node as one group, and display control means for classifying the inputted image content based on the determined group and controlling a display section to display the inputted image content. In the image pickup apparatus, position information of an image content corresponding to a picked up image is acquired, and binary tree structure data corresponding to a binary tree having leaves to which inputted image contents correspond are produced based on the acquired position information of the image contents. Then, a node which satisfies the predetermined condition is extracted from among nodes of the produced binary tree structure data, and those of the image contents which belong to the extracted node are determined as one group. Then, the inputted image content is classified based on the determined group and displayed on the display section.

With the content management apparatus and method, program, image display apparatus and image pickup apparatus, a superior advantage that contents can be classified appropriately in accordance with the liking of the user is achieved.

The above and other objects, features and advantages of the present invention will become apparent from the following description and the appended claims, taken in conjunction with the accompanying drawings in which like parts or elements denoted by like reference characters.

BRIEF DESCRIPTION OF THE DRAWINGS

FIG. 2 is a block diagram showing an example of a hardware configuration of the image pickup apparatus;

FIGS. 13 to 16B are diagrammatic views illustrating relationships between a cluster corresponding to a group determined using a conditional expression for grouping and contents belonging to the cluster;

FIGS. 33A to 39B are views illustrating an attribute value of individual clusters and the distance between the clusters where data are to be clustered;

DETAILED DESCRIPTION OF THE PREFERRED EMBODIMENT

Figure 1A:
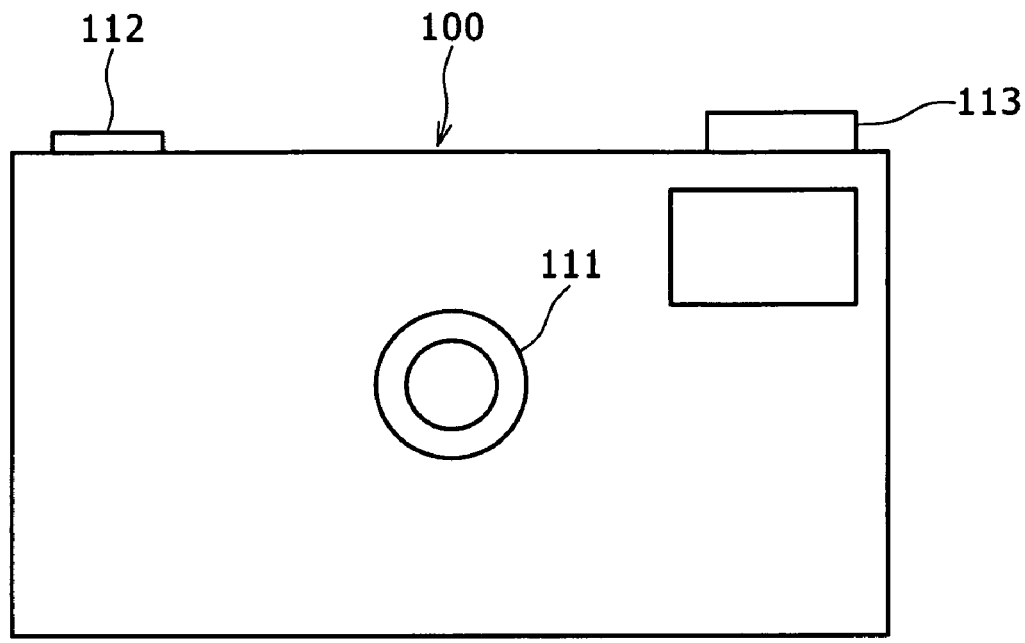
FIGS. 1A and 1B are a front elevational view and a rear elevational view, respectively, showing an appearance of an image pickup apparatus to which the present embodiment is applied.
Figure 1B:
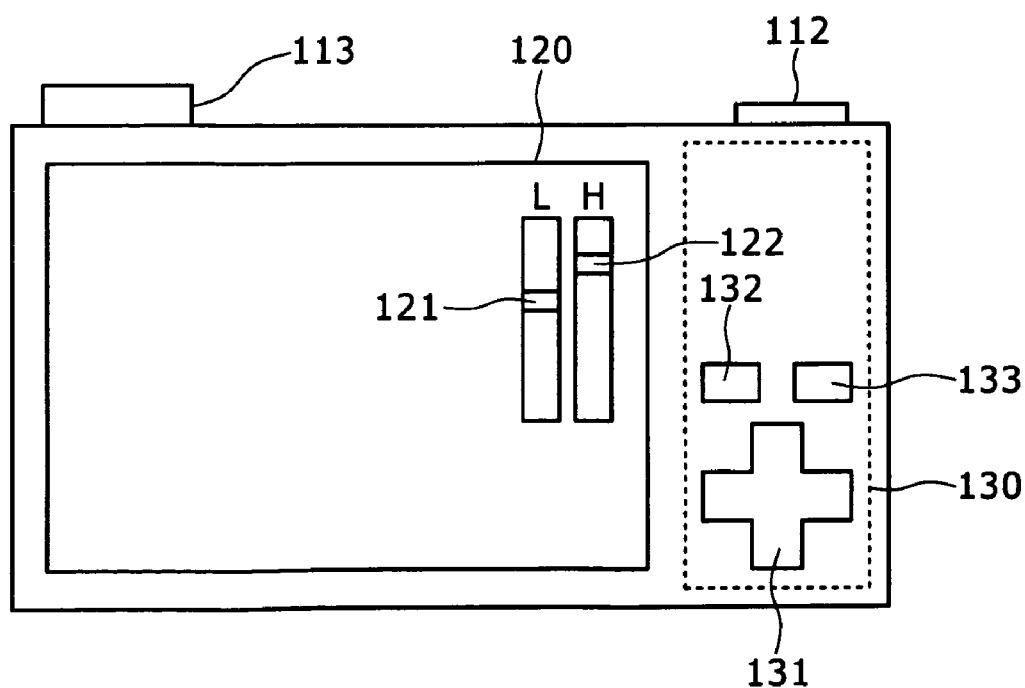

FIGS. 1A and 1B show an appearance of an image pickup apparatus 100 to which the present embodiment is applied, and particularly FIG. 1A shows the front of the image pickup apparatus 100 and FIG. 1B shows the back of the image pickup apparatus 100. The image pickup apparatus 100 has a general configuration of an appearance where it is formed as a digital still camera as an example thereof.

Referring to FIGS. 1A and 1B, the image pickup apparatus 100 includes a camera lens 111, a shutter button 112, a GPS reception antenna 113, a display section 120 and an operation acceptance section 130.

The camera lens 111 is used to pick up an image of an image pickup object.

The shutter button 112 is depressed in order to pick up an image of an image pickup object.

The GPS reception antenna 113 is used to receive a GPS (Global Positioning System) signal and outputs the received GPS signal to a GPS signal processing apparatus 142 shown in FIG. 2.

The display section 120 displays a monitoring image being picked up, an image picked up already or the like. Also grouping condition setting bars 121 and 122 are displayed on the display section 120. The grouping condition setting bars 121 and 122 are used to set a condition for a cluster when picked up images are classified. It is to be noted that condition setting carried out using the grouping condition setting bars 121 and 122 is hereinafter described in detail with reference to FIGS. 13 to 17. The display section 120 may be, for example, a liquid crystal display apparatus (LCD).

The operation acceptance section 130 includes various operation buttons and so forth and accepts and outputs an operation input from any of the buttons and so forth to a central processing unit 143 shown in FIG. 2. The operation acceptance section 130 includes, for example, a cross button 131 and buttons 132 and 133.

The cross button 131 is depressed in order to move an image or the like displayed on the display section 120 upwardly, downwardly, leftwardly or rightwardly. For example, in order to move the grouping condition setting bars 121 and 122 displayed on the display section 120 upwardly or downwardly, the cross button 131 is depressed at an upper portion or lower portion thereof. The buttons 132 and 133 have various functions allocated thereto. It is to be noted that at least part of the operation acceptance section 130 and the display section 120 may be formed integrally with each other as a touch panel.

FIG. 2 shows an example of a hardware configuration of the image pickup apparatus 100.

Referring to FIG. 2, the image pickup apparatus 100 shown includes a GPS reception antenna 113, a display section 120, an operation acceptance section 130, a camera control apparatus 141, a GPS signal processing apparatus 142, a central processing unit 143, a storage apparatus 144 and a battery 145. It is to be noted that the GPS reception antenna 113, display section 120 and operation acceptance section 130 are similar to those shown in FIG. 1.

The camera control apparatus 141 includes an image pickup section including an optical system such as the camera lens 111 and an image pickup element and executes control for causing the image pickup section to carry out image pickup. Further, the camera control apparatus 141 forms an image inputted from the camera lens 111 and corresponding to an image pickup object, converts image information corresponding to the picked up image into digital data and outputs the digital data to the central processing unit 143.

The GPS signal processing apparatus 142 calculates position information at present based on a GPS signal received by the GPS reception antenna 113 and outputs the calculated position information to the central processing unit 143. It is to be noted that the calculated position information includes various metadata of the altitude, latitude, height and so forth.

The central processing unit 143 executes a predetermined mathematical operation process based on various programs stored in a memory not shown and controls the components of the image pickup apparatus 100. Further, the central processing unit 143 executes the predetermined mathematical operation based on various information read out from the storage apparatus 144, the operation substance inputted from the operation acceptance section 130 and so forth. Further, the central processing unit 143 executes various signal processes for digital data outputted from the camera control apparatus 141 and outputs an image content, which is image data for which the signal processes have been carried out, to the storage apparatus 144 and the display section 120.

The storage apparatus 144 stores image contents which are picked up images and so forth and outputs various information stored therein to the central processing unit 143. The storage apparatus 144 further stores a pickup image database 230, a binary tree database 270 and a cluster database 280 illustrated in FIG. 3.

The battery 145 supplies power to the components of the image pickup apparatus 100.

Figure 3:
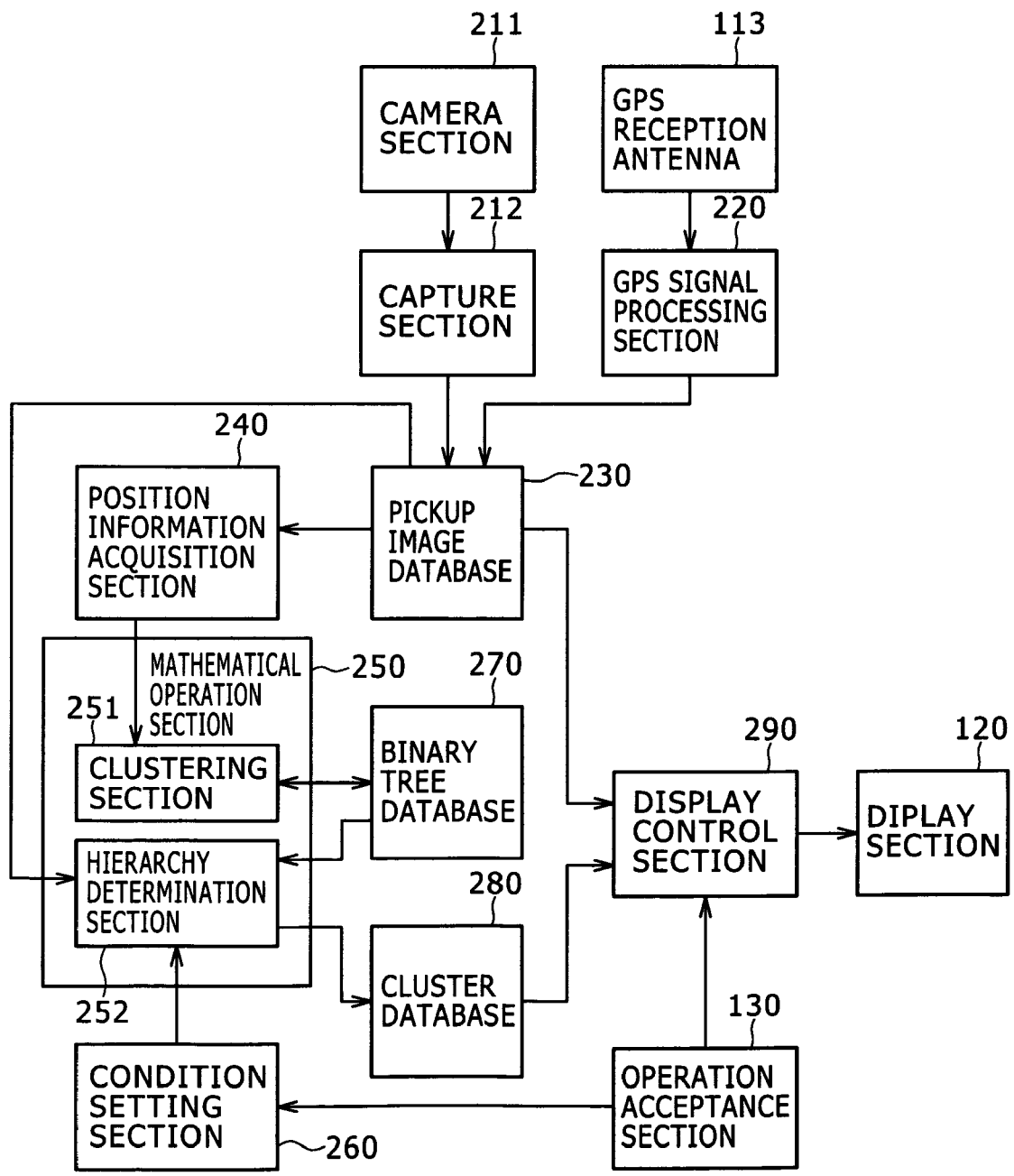
FIG. 3 is a block diagram showing an example of a functional configuration of the image pickup apparatus.

FIG. 3 shows an example of a functional configuration of the image pickup apparatus 100 according to the present embodiment. Referring to FIG. 3, the image pickup apparatus 100 includes the GPS reception antenna 113, display section 120, operation acceptance section 130, a camera section 211, a capture section 212, a GPS signal processing section 220, pickup image database 230, a position information acquisition section 240, a mathematical operation section 250, a condition setting section 260, binary tree database 270 and cluster database 280, and a display control section 290. It is to be noted that the GPS reception antenna 113, display section 120, and operation acceptance section 130 are the same as those shown in FIGS. 1A and 1B and the GPS signal processing section 220 corresponds to the GPS signal processing apparatus 142 shown in FIG. 2.

The camera section 211 forms an image corresponding to an image pickup object and outputs image information corresponding to the picked up image to the capture section 212.

The capture section 212 converts image information outputted from the camera section 211 into digital data and outputs the resulting digital data to the pickup image database 230.

The pickup image database 230 records an image content corresponding to digital data converted by the capture section 212. It is to be noted that, in an image content recorded in the pickup image database 230, an Exif (Exchangeable Image File Format) tag is placed, and various metadata such as image pickup position information and image pickup time are placed in the Exif tag. Further, from among various metadata included in position information calculated by the GPS signal processing section 220, the latitude, altitude and height are recorded into the Exif tag of each image content stored in the pickup image database 230.

The position information acquisition section 240 acquires image pickup position information from the Exif tag of each of image contents recorded in the pickup image database 230 and outputs the acquired image pickup position information to the mathematical operation section 250. It is to be noted that such acquisition of image pickup position information is carried out as occasion demands when a clustering process is executed after image pickup or upon image accessing or the like.

The mathematical operation section 250 includes a clustering section 251 and a hierarchy determination section 252.

The clustering section 251 classifies image contents stored in the pickup image database 230 using a technique called clustering. In the embodiment of the present invention, data of a binary tree structure wherein each of image contents is a leaf are used in the clustering. A node of the binary tree structure data corresponds to a cluster.

The clustering section 251 carries out clustering such that the clusters of the binary tree structure data have a hierarchical structure based on image pickup position information received from the position information acquisition section 240. The binary tree structure data are retained in the binary tree database 270. It is to be noted that the hierarchical clustering process and production of the binary tree structure data are hereinafter described in detail with reference to FIGS. 4 to 10 and so forth.

The hierarchy determination section 252 extracts, from among nodes of the binary tree structure data stored in the binary tree database 270, a node which satisfies a grouping condition set by the condition setting section 260, and determines those image contents corresponding to leaves which belong to the extracted node as one group. In particular, the hierarchy determination section 252 calculates the density of contents in a cluster corresponding to a node in the binary tree structure data stored in the binary tree database 270 for each node and extracts those nodes with regard to which the calculated density of clusters satisfies the grouping condition. Further, the hierarchy determination section 252 acquires image pickup time information from the Exif tag of the image contents recorded in the pickup image database 230 and calculates, for each node, the number of events in a cluster corresponding to a node of binary tree structure data stored in the binary tree database 270 based on the acquired image pickup time information. Further, the hierarchy determination section 252 extracts those nodes with regard to which the calculated event number satisfies the grouping condition.

Here, an event signifies a collection based on time which image contents have. In this manner, the hierarchy determination section 252 determines those clusters which satisfy the grouping condition from among clusters produced by clustering to determine the desired clusters as an appropriate group from among the plural clusters. It is to be noted that the determination method in this instance is hereinafter described in detail with reference to FIGS. 13 to 17 and so forth.

The condition setting section 260 retains, when an operation input relating to a grouping condition is accepted by the operation acceptance section 130, the grouping condition corresponding to the operation input and outputs the grouping condition to the hierarchy determination section 252. The operation input relating to a grouping condition can be inputted, for example, by moving the grouping condition setting bars 121 and 122 displayed on the display section 120 upwardly or downwardly by an operation from the operation acceptance section 130. Or, the condition setting section 260 may set, based on a history of operation of a user or grouping in the past stored in advance, a grouping condition and output the set grouping condition to the hierarchy determination section 252.

The cluster database 280 stores cluster data for each of clusters corresponding to the hierarchy of each of nodes in the binary tree structure data determined by the hierarchy determination section 252. It is to be noted that cluster data are hereinafter described in detail with reference to FIG. 12.

The display control section 290 reads out, if an operation input indicative of accessing to a cluster is accepted by the operation acceptance section 130, cluster data from the cluster database 280 and reads out image contents from the pickup image database 230. Then, the display control section 290 groups the image contents based on the read out cluster data to produce an access view and causes the display section 120 to display the access view. It is to be noted that examples of display of an access view are illustrated in FIGS. 18 and 19.

Now, a clustering method of clustering, that is, hierarchically clustering, a plurality of contents is described in detail.

The clustering is to disintegrate a set of data into groups or classes in each of which the data have a small distance from each other. It is to be noted that, in the present embodiment, data of photo contents, that is, photographic image contents, are used. The distance between image contents is the distance between image pickup positions corresponding to the image contents. Meanwhile, a cluster is a unit into which contents are collected by clustering. Finally grouped contents can be handled through such operations as coupling and decoupling of clusters. It is to be noted that, in the present embodiment, such grouping is carried out using binary tree structure data as described below.

Figure 4A:
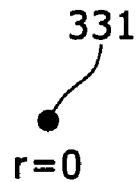
FIGS. 4A to 4C are diagrammatic views illustrating an outline of a cluster to which one or a plurality of contents belong.
Figure 4B:
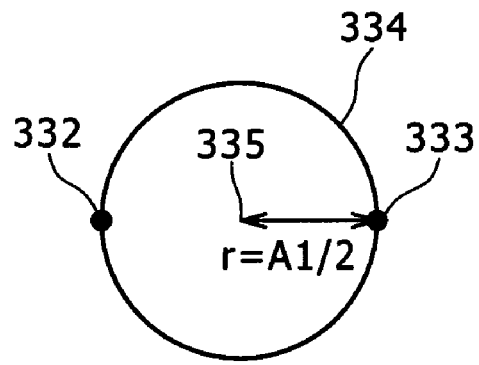
Figure 4C:
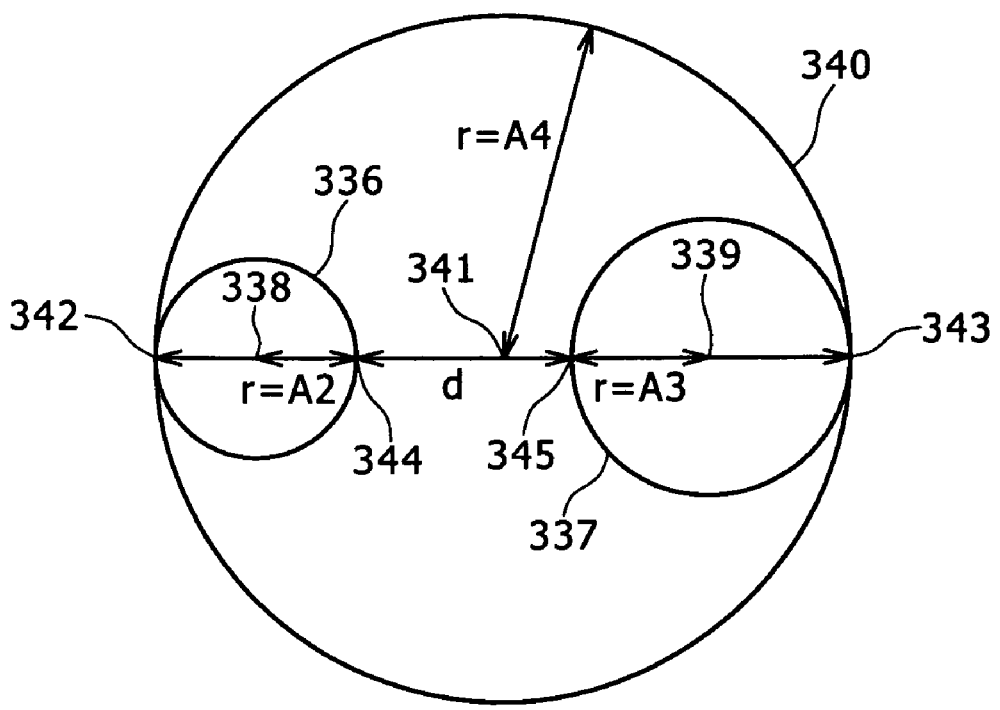

FIGS. 4A to 4C illustrate an outline of a cluster to which one or a plurality of contents belong. In particular, FIG. 4A illustrates a cluster 331 to which one content belongs, and FIG. 4B illustrates a cluster 334 to which two contents belong. Further, FIG. 4C illustrates a cluster 340 to which at least four contents belong. It is to be noted that the cluster 334 illustrated in FIG. 4B includes clusters 332 and 333 each having one content, and the cluster 340 illustrated in FIG. 4C includes clusters 336 and 337 each having at least two contents. Further, the clustering in this instance is carried out for contents disposed two-dimensionally.

Each cluster produced after a plurality of contents are clustered is represented by a circular region and has a center position or center point and a radius of the circle as attribute values. In this manner, contents which belong to a cluster are included in a circular cluster region which is defined by a center point and a radius.

For example, where one content belongs to the cluster 331 as seen in FIG. 4A, the center position of the cluster 331 is the position of the content which belongs to the cluster 331. Meanwhile, the radius of the cluster 331 is 0, that is, r=0.

Meanwhile, where two contents, that is, the clusters 332 and 333, belong to the cluster 334 as seen in FIG. 4B, the center position 335 of the cluster 334 is the position of the midpoint on a straight line interconnecting the positions of the two contents. Also, the radius of the cluster 334 is a half the length of the straight line interconnecting the positions of the two contents. For example, where the distance of the straight line interconnecting the clusters 332 and 333 corresponding to the two contents is A1, the radius is A1/2, that is, r=A1/2. It is to be noted that, in clustering, where the distance between clusters to each of which one content belongs is to be calculated, the distance between the position of the content belonging to the cluster 332 and the position of the content belonging to the cluster 333 is calculated.

Further, for example, where at least four contents belong to the cluster 340 as seen in FIG. 4C, the center position 341 of the cluster 340 is the position of the midpoint on a straight line which interconnects the center position 338 of the cluster 336 and the center position 339 of the cluster 337 and interconnects a position 342 at which the circle of the cluster 340 and the circle of the cluster 336 contact with each other and a position 343 at which the circle of the cluster 340 and the circle of the cluster 337 contact with each other. Further, the radius of the cluster 340 is a half the length of the straight line interconnecting the position 342 and the position 343. It is to be noted that, in clustering, where the distance between clusters in each of which a plurality of contents belong is to be calculated, the smallest distance between outer circumferences of the individual clusters is calculated. For example, the distance between the clusters 336 and 337 is the distance d between the position 344 on the circle of the cluster 336 and the position 345 on the circle of the cluster 337 which exist on the straight line interconnecting the position 342 and the position 343. In this instance, where the radius of the cluster 336 is represented by A2 and the radius of the cluster 337 is represented by A3 while the radius of the cluster 340 is represented by A4, the distance d between the clusters 336 and 337 is 2(A4−A2−A3). It is to be noted that the calculation method of the distance between clusters and the clustering method are hereinafter described in detail with reference to FIGS. 22A to 43.

FIGS. 5 to 9 illustrate a concept of transition where contents 351 to 355 disposed on a plane are clustered based on position information.

Figure 5:
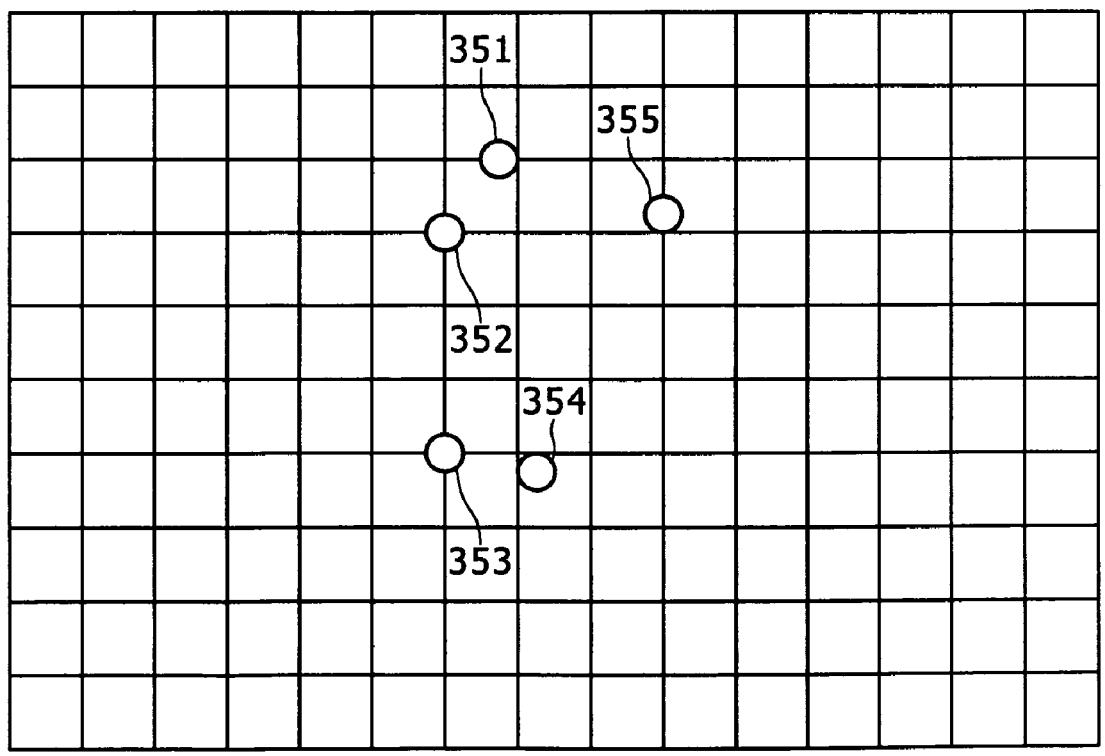
FIGS. 5 to 9 are diagrammatic views illustrating a concept of transition upon clustering of contents disposed on a plane based on position information.

Referring to FIG. 5, the contents 351 to 355 stored in the pickup image database 230 are disposed on a plane based on the position information of the contents 351 to 355. It is to be noted that such disposition of the contents is virtual.

Figure 6:
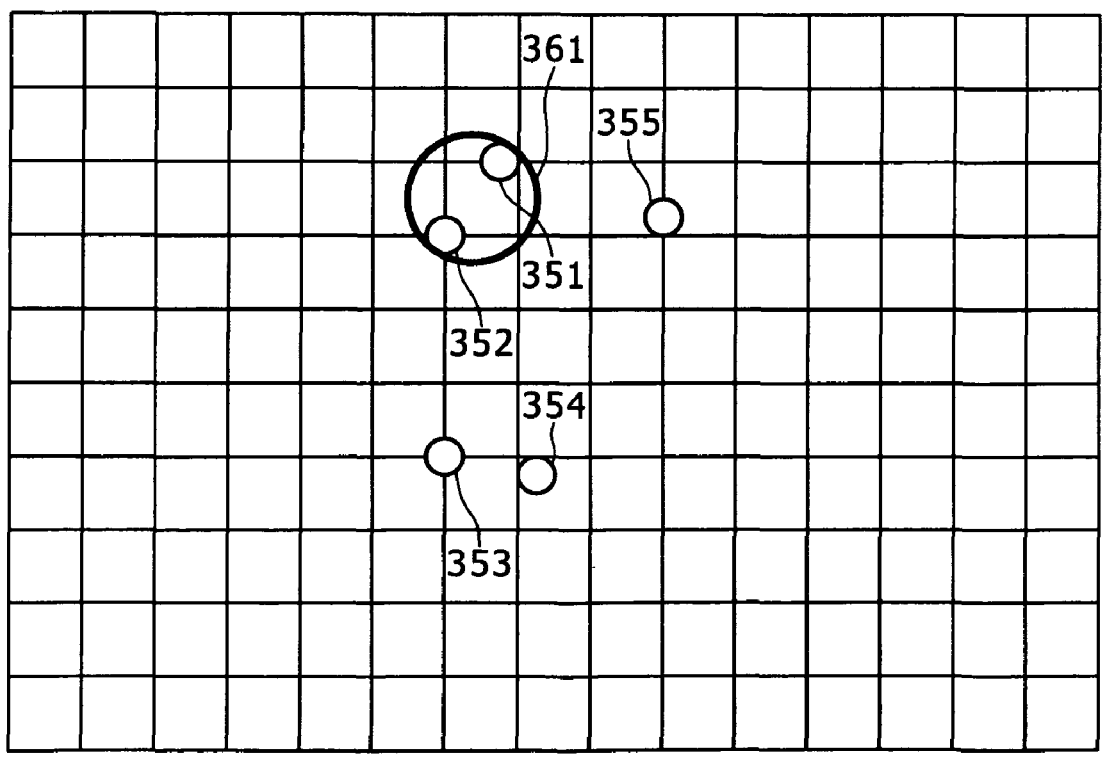

Then, the distance between the contents is calculated. Then, based on results of the calculation, a cluster 361 is produced from the contents 351 and 352 with regard to which the distance between contents is smallest as seen in FIG. 6.

Figure 7:
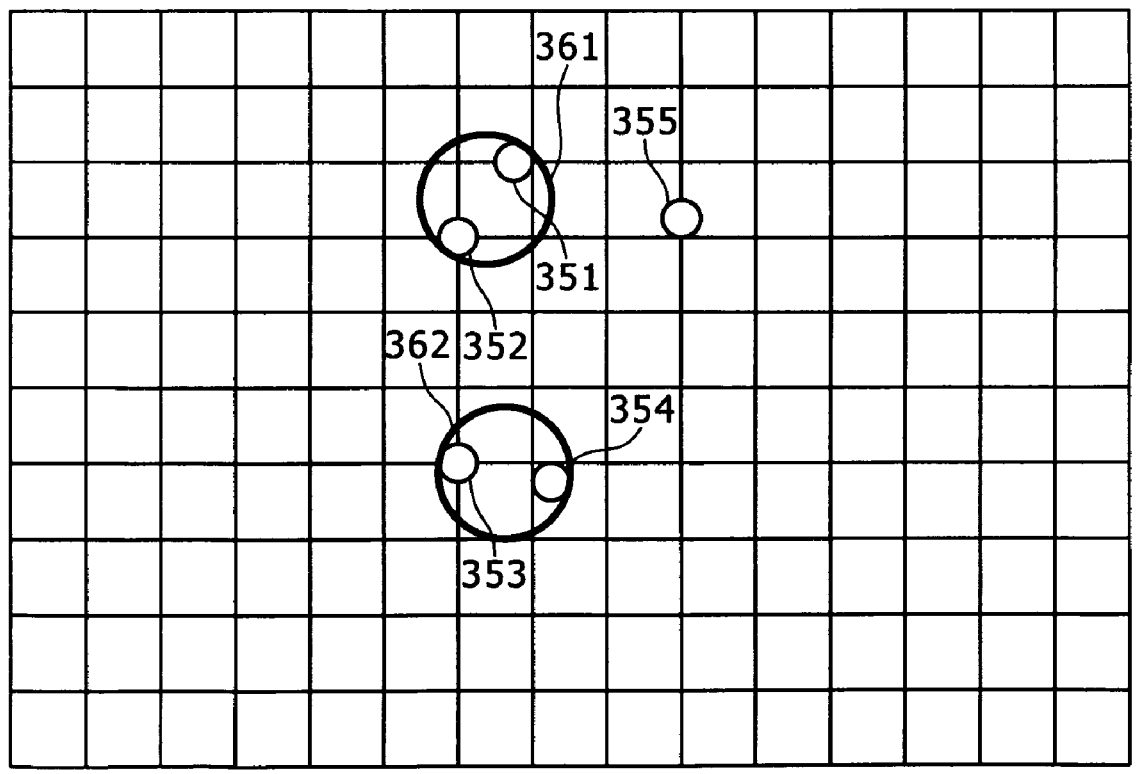

Then, the distance between the contents 353 to 355 and the cluster 361 is calculated. Based on results of the calculation, a cluster 362 is produced from the contents 353 and 354 with regard to which the distance between contents or clusters is smallest as seen in FIG. 7.

Figure 8:
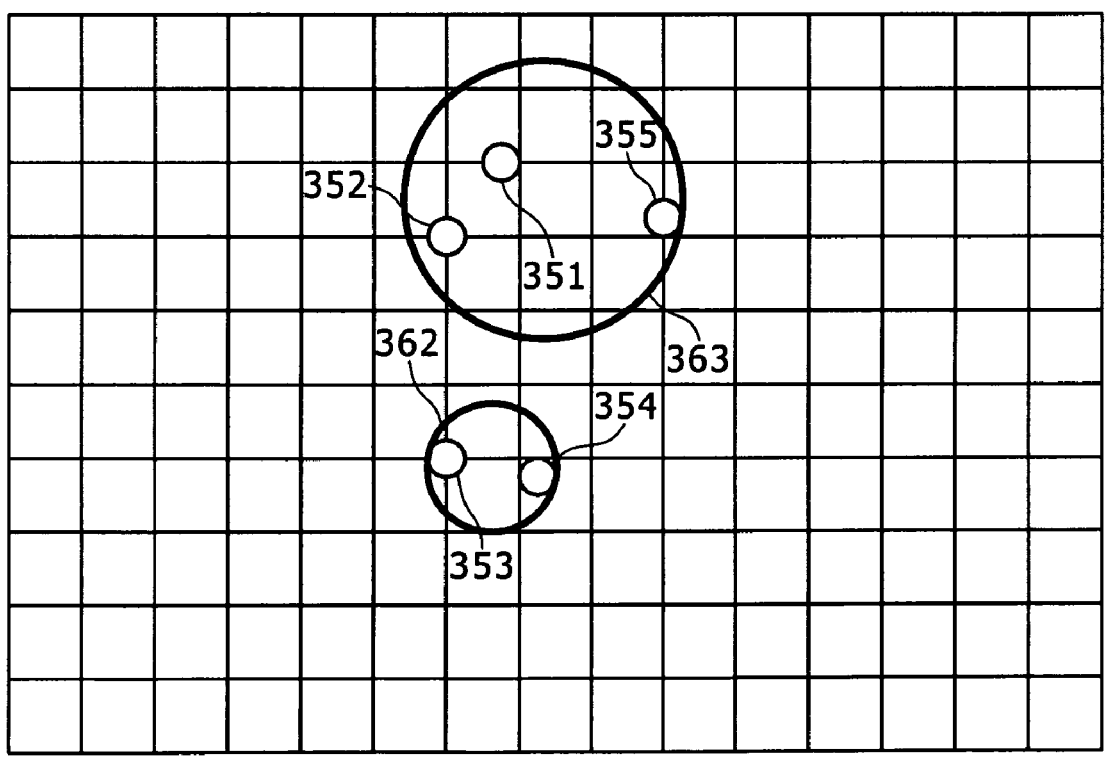
Figure 9:
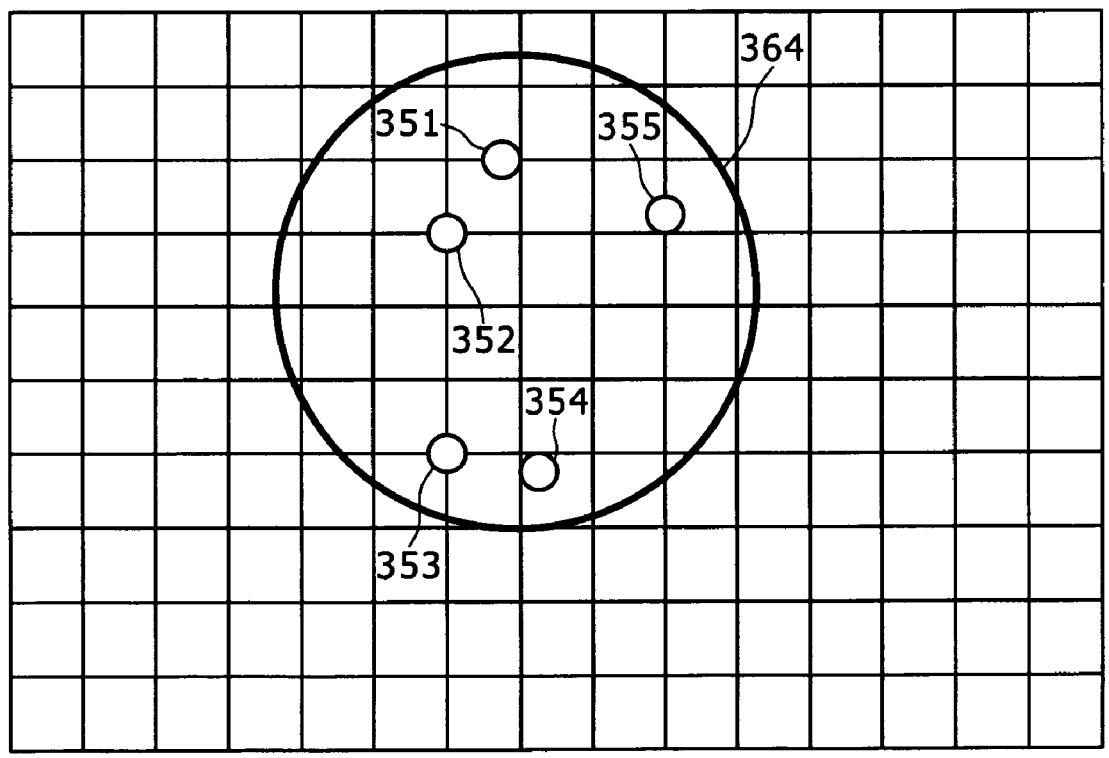

Thereafter, the distance between the content 355, cluster 361 and cluster 362 is calculated. Based on results of the calculation, a cluster 363 is produced from the cluster 361 and the content 355 with regard to which the distance between contents or clusters is smallest as seen in FIG. 8.

Then, a cluster 364 is produced from the cluster 362 and the cluster 363 which remain. In this manner, the five data of the contents 351 to 355 are successively clustered to produce the clusters 361 to 364. Further, binary tree structure data are produced based on the clusters 361 to 364 produced in such a manner as described above. Further, the thus produced binary tree structure data regarding the clusters 361 to 364 are stored into the binary tree database 270.

Figure 10:
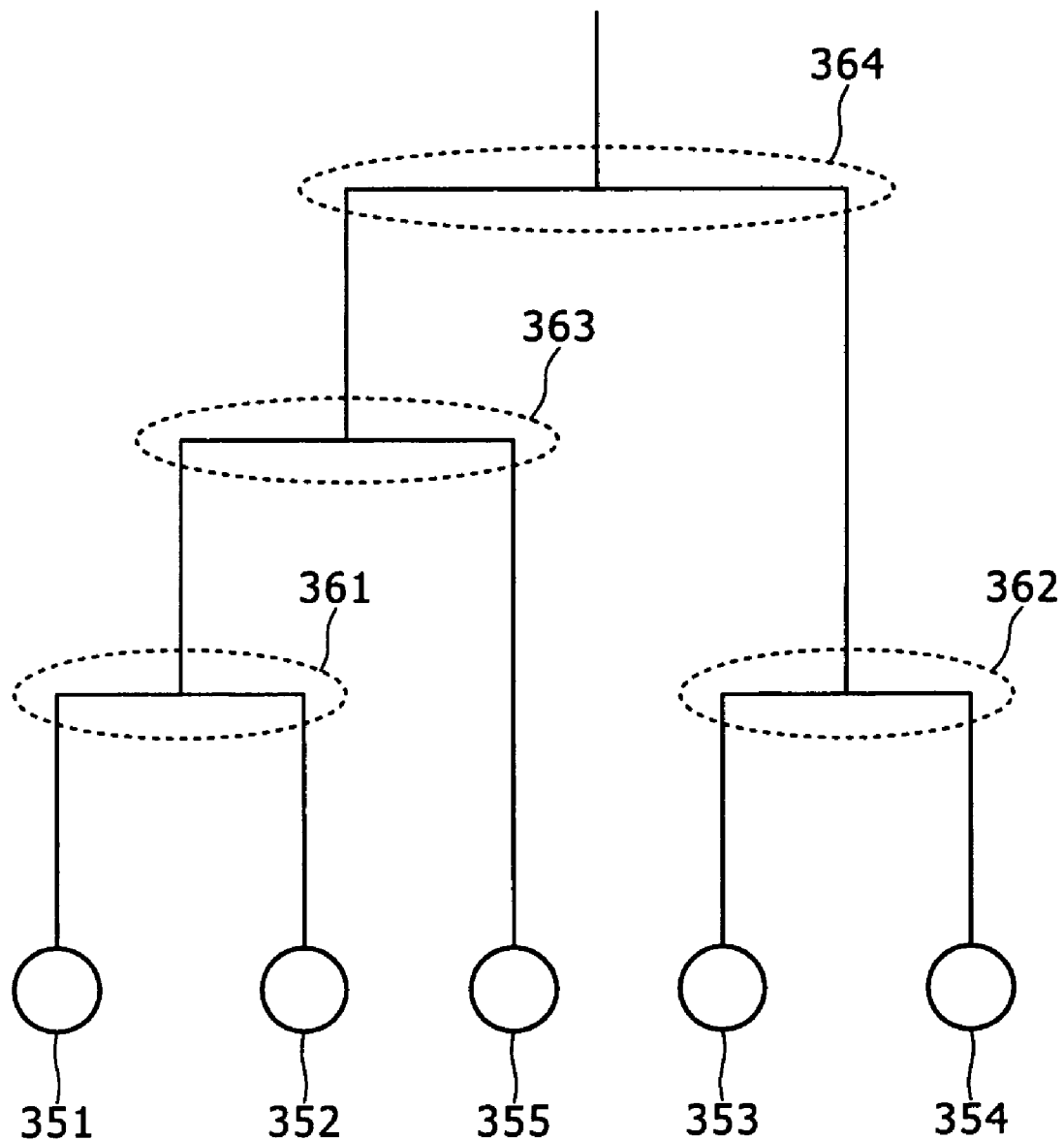
FIG. 10 is diagrammatic view illustrating a concept of a clustering tree diagram of a binary tree structure illustrating binary tree structure data produced based on clusters.

FIG. 10 illustrates a concept of a clustering tree diagram of the binary tree structure of the binary tree structure data produced based on the clusters 361 to 364.

Where the contents 351 to 355 are clustered to produce the clusters 361 to 364 as seen in FIGS. 5 to 9, binary tree structure data corresponding to a binary tree shown in FIG. 10 are produced based on the produced clusters 361 to 364. It is to be noted that, in the binary tree, a content and a leaf correspond to each other, and a cluster and a node correspond to each other. In the clustering tree diagram shown in FIG. 10, the leaves corresponding to the contents 351 to 355 are denoted by like reference numbers to those of the contents, and the nodes corresponding to the clusters 361 to 364 are denoted by like reference numerals to those of the clusters. It is to be noted that, while each of the contents 351 to 355 individually forms a cluster, the cluster numbers of such clusters are not particularly indicated in FIG. 10.

Figure 11:
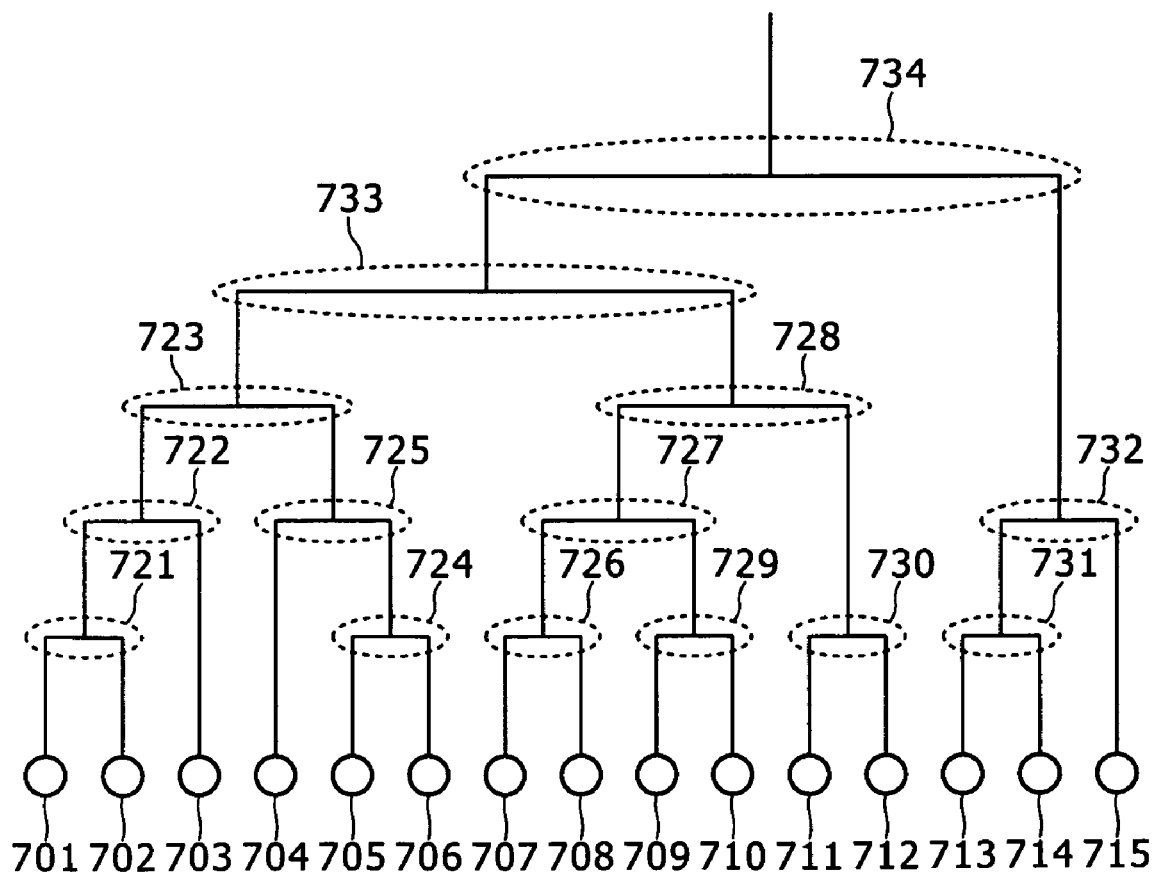
FIG. 11 is a similar view but illustrating a concept of a clustering tree diagram of a binary tree structure and illustrating binary tree structure data produced based on contents.

FIG. 11 illustrates a concept of a clustering tree diagram of a binary tree structure indicative of binary tree structure data produced based on contents 701 to 715. The example of the binary tree shown in FIG. 11 corresponds to binary tree structure data produced by clustering the contents 701 to 715 to produce clusters 721 to 734. It is to be noted that, in the clustering tree diagram shown in FIG. 11, the leaves corresponding to the contents 701 to 715 are denoted by like reference numerals to those of the contents, and the nodes corresponding to the clusters 721 to 734 are denoted by like reference numerals to those of the clusters. Further, the numbers of clusters formed by the contents 701 to 715 by themselves are not illustrated in FIG. 11.

Figure 12:
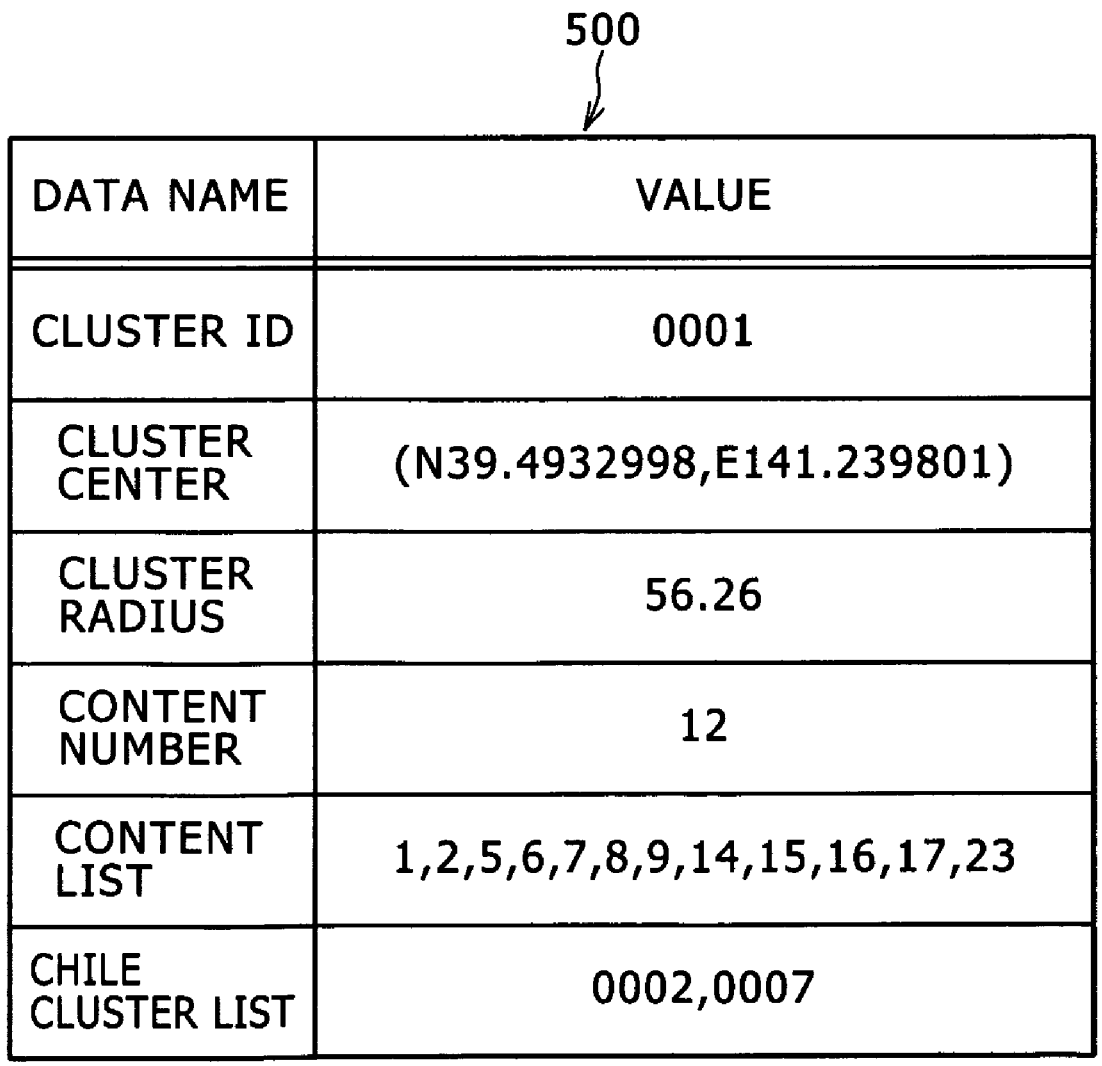
FIG. 12 is a diagrammatic view illustrating an example of cluster data relating to clusters produced by clustering.

FIG. 12 illustrates an example of cluster data regarding clusters produced by clustering.

Referring to FIG. 12, the cluster data 500 is unique information to a produced cluster and has a cluster ID, a cluster center position, a cluster radius, a content number, a content list and a child cluster list recorded therein. It is to be noted that a content ID which is an identifier of a content is applied to each content.

The cluster ID is an identifier of a cluster corresponding to the cluster data 500 and has an integer value of, for example, four digits. The cluster center position is data representative of the center position of the cluster corresponding to the cluster data 500 and has recorded therein altitude and latitude corresponding, for example, to the center position of the cluster. The cluster radius is data indicative of the radius of the cluster corresponding to the cluster data 500 and has recorded therein a value whose unit is, for example, meter (m). The content number is data representative of the number of contents included in a cluster region of the cluster corresponding to the cluster data 500. The content data list is data indicative of IDs of integral values of contents included in the cluster region of the cluster corresponding to the cluster data 500 and has recorded therein a list of integral values as the IDs of contents.

The child cluster list is data indicative of cluster IDs of clusters, that is, child clusters, included in the cluster region of the cluster corresponding to the cluster data 500. In particular, all IDs of one or a plurality of clusters which exist in lower hierarchies of the cluster are recorded in the child cluster list.

The cluster data may include, in addition to the data mentioned above, metadata of contents themselves belonging to the cluster, statistic information of such metadata and so forth depending upon the contents or applications. Such cluster data are stored as data relating to binary tree structure data into the binary tree database 270. Further, each content has added thereto a content ID and a cluster ID of a cluster to which the content of the content ID belongs as metadata. It is to be noted that, where a cluster ID is added as metadata of a content, although it is suitable to use a method of utilizing a file region of the Exif tag or the like to embed the cluster ID into the content itself, only metadata of contents may be managed separately.

It is to be noted that, among the cluster data mentioned above, the cluster data relating to a cluster determined by the hierarchy determination section 252 is stored into the cluster database 280. Further, a cluster determined by the hierarchy determination section 252 is hereinafter described in detail with reference to FIGS. 13 to 17.

Now, a method of determining a cluster which satisfies predetermined conditions from among a plurality of produced clusters is described in detail with reference to the drawings.

In the present embodiment, clusters produced by the clustering process are grouped based on predetermined conditions. Consequently, an appropriate group of contents conforming to the liking of the user can be displayed. For example, an expression (1) given below is used to determine a cluster density of clusters corresponding to each node in binary tree structure data stored in the binary tree database 270:

$$D_C = n_C / S_C \qquad (1)$$

where $D_C$ is the density of a cluster C, $n_C$ is the number of contents included in the cluster C, and $S_C$ is the area of the cluster C. It is to be noted that the area $S_C$ of a cluster is calculated based on the radius of the cluster. For example, in the binary tree shown in FIG. 11, the cluster density of the clusters 721 to 734 corresponding to individual nodes is calculated.

Then, those clusters which have a cluster density which satisfies an expression (2) which is an example of a conditional expression for grouping given below from among the cluster densities determined as described above are extracted from the binary tree database 270 and determined as a group. Then, the group is stored into the cluster database 280. In this instance, whether or not the expression (2) is satisfied is successively decided beginning with a node of a comparatively low hierarchy in the binary tree structure data stored in the binary tree database 270. Then, a node which satisfies the expression (2) is extracted from the nodes.

$$D_L \leq D_C < D_H \qquad (2)$$

where $D_L$ and $D_H$ are parameter constants and a lower limit value and an upper limit value to the density of clusters determined as a group, respectively. For example, where the values of the parameter coefficients $D_L$ and $D_H$ are set to comparatively low values, clusters having a comparatively low cluster density $D_C$ are extracted. On the other hand, where the values of the parameter coefficients $D_L$ and $D_H$ are set to comparatively high values, clusters having a comparatively high cluster density $D_C$ are extracted. Meanwhile, where the values of the parameter coefficients $D_L$ and $D_H$ are set such that the difference therebetween has a low value, only clusters having cluster density values which are comparatively near to each other are extracted, and therefore, the number of extracted clusters is comparatively small. On the other hand, where the values of the parameter coefficients $D_L$ and $D_H$ are set such that the difference therebetween has a high value, since clusters having cluster density values which are comparatively far from each other are extracted, and therefore, the number of extracted clusters is comparatively great.

For example, in the binary tree shown in FIG. 11, it is successively decided for the clusters 721, 724, 726, 729, 730 and 731 corresponding to the nodes of the lowest hierarchy whether or not the determined cluster density satisfies the expression (2). Then, those clusters whose cluster density satisfies the expression (2) are extracted. In this instance, if some of the clusters 721, 724, 726, 729, 730 and 731 whose cluster density does not satisfy the expression (2) exists, then the cluster is moved to a cluster corresponding to a node of a higher hierarchy than that of the cluster, and it is decided whether or not the cluster density of the cluster after moved satisfies the expression (2). For example, if the cluster density of the cluster 726 from among the clusters 721, 724, 726, 729, 730 and 731 does not satisfy the expression (2) while the cluster density of the other clusters 721, 724, 729, 730 and 731 satisfies the expression (2), then although the clusters 721, 724, 729, 730 and 731 are extracted, the cluster 726 is not extracted. In this instance, it is decided whether or not the cluster density of the cluster 727 corresponding to a node of a higher hierarchy than that of the cluster 726 satisfies the expression (2). Then, if the cluster density of the cluster 727 satisfies the expression (2), then the cluster 727 is extracted together with the clusters 721, 724, 729, 730 and 731. On the other hand, if the cluster density of the cluster 727 does not satisfy the expression (2), then it is decided whether or not the cluster density of the cluster 728 corresponding to a node of a higher hierarchy than that of the cluster 727 satisfies the expression (2). In this manner, each cluster whose cluster density satisfies the expression (2) is successively extracted while, as regards each cluster whose cluster density does not satisfy the expression (2), the cluster is moved to a cluster of a higher hierarchy and it is successively decided whether or not the cluster density of the cluster after moved satisfies the expression (2).

In this manner, clusters whose cluster density $D_C$ falls within the range between the parameter constants $D_L$ and $D_H$ are extracted and outputted as a group. It is to be noted that the parameter constants $D_L$ and $D_H$ may otherwise be set in advance. Alternatively, the parameter constants $D_L$ and $D_H$ may be set suitably by the user by moving the grouping condition setting bar 121 displayed on the display section 120 to vary the value of the parameter constant $D_L$ and moving the grouping condition setting bar 122 to vary the value of the parameter constant $D_H$. Or else, one of the parameter constants $D_L$ and $D_H$ may be set.

Figure 13:
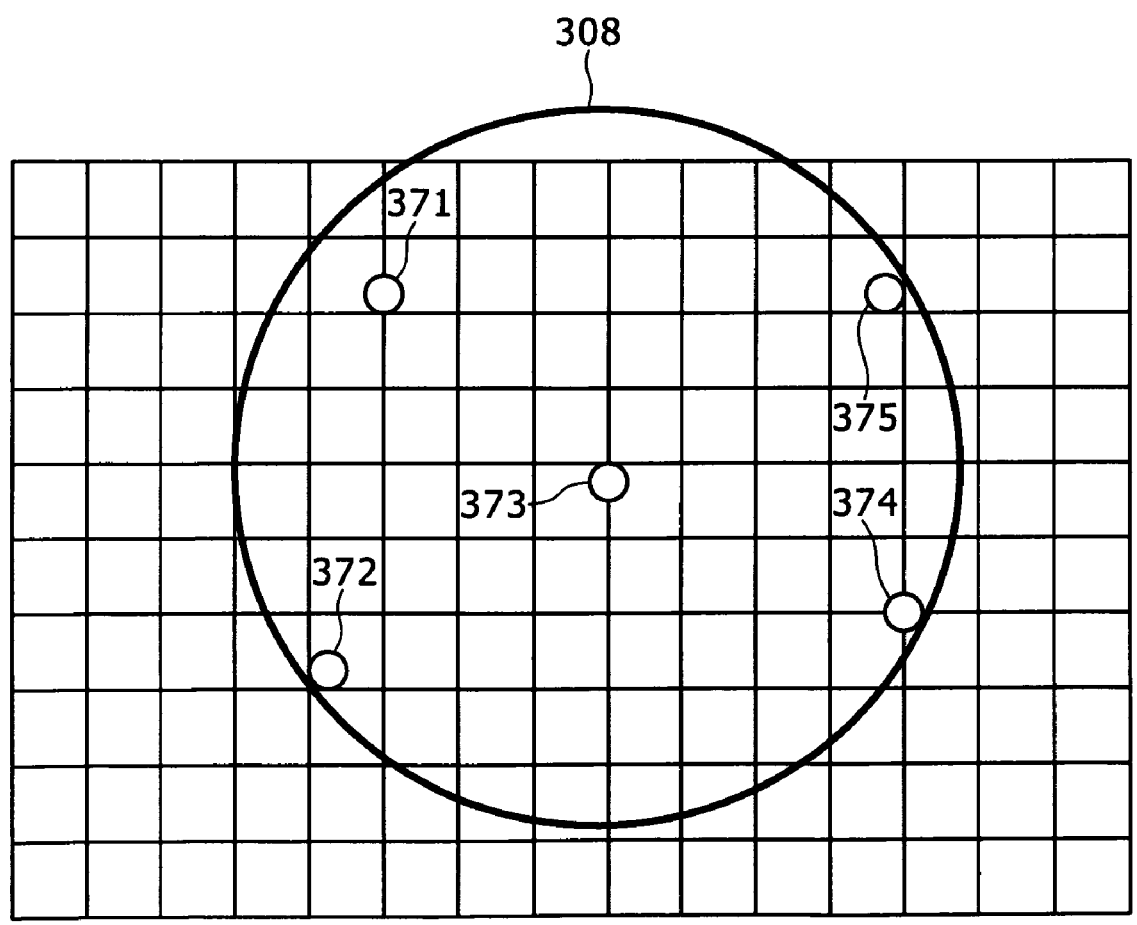
Figure 14:
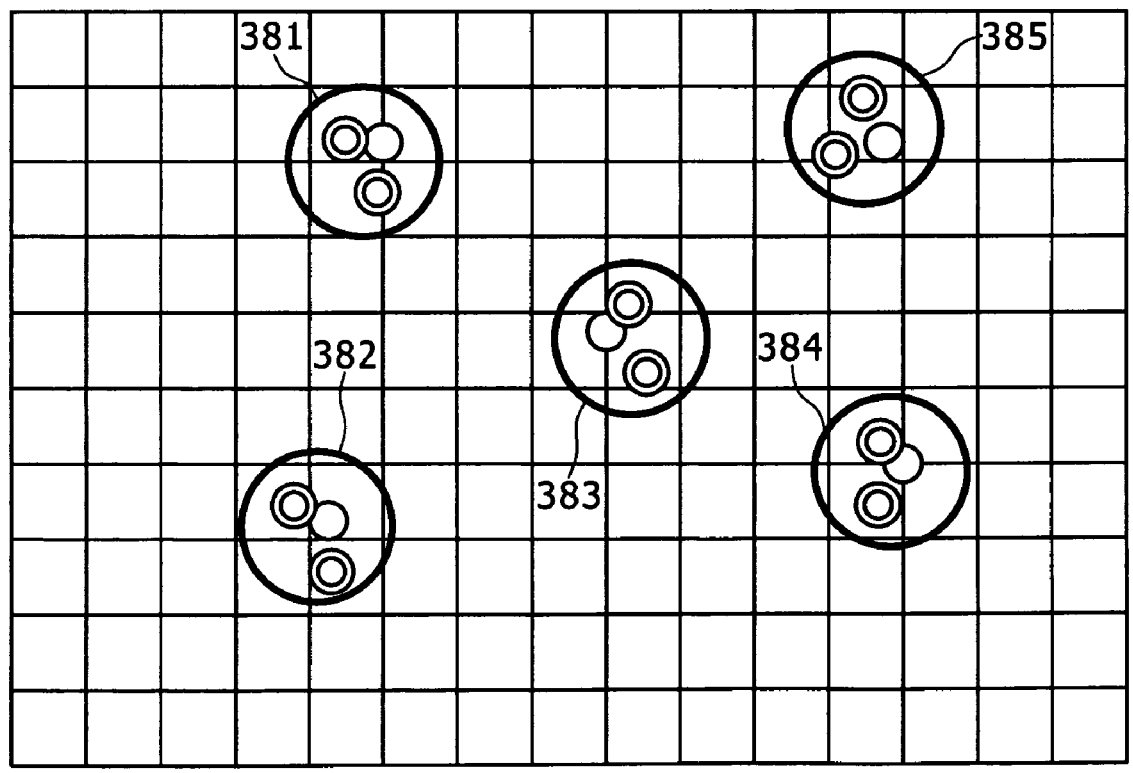

FIGS. 13 and 14 illustrate a relationship between clusters corresponding to groups determined using the conditional expression for grouping given as the expression (2) and contents belonging to the clusters. It is to be noted that a small circle shown in FIGS. 13 and 14 represents one content and a double circle shown in FIG. 14 represents that a plurality of contents exist at the same position.

For example, in a region wherein contents 371 to 375 are distributed sparsely as seen in FIG. 13, they are grouped as a large cluster. Meanwhile, where comparatively low values are set as the values of the parameter constants $D_L$ and $D_H$, a group corresponding to clusters whose cluster density $D_C$ is comparatively low is outputted. Therefore, for example, as seen in FIG. 13, a large cluster to which the contents 371 to 375 distributed sparsely belong is grouped.

On the other hand, where a plurality of contents overlap at the same points or a plurality of contents are crowded in a small area as seen in FIG. 14, the contents are grouped as a small cluster. On the other hand, where a comparatively low value is set as the values of the parameter coefficients $D_L$ and $D_H$, a group corresponding to a cluster whose density $D_C$ is comparatively low is outputted. Therefore, clusters 381 to 385 to each of which a plurality of contents concentrated in a small area, for example, as seen in FIG. 14 belong are grouped.

The foregoing description is directed to an example wherein clusters produced by a clustering process are grouped based on the cluster density as a condition for grouping the clusters. Now, an example wherein clusters are grouped using a grouping condition other than the cluster density is described. In the example described below, clusters are grouped based on temporal information of contents as a grouping condition.

For example, clusters which include an event number which satisfies the following expression (3), which is an example of the conditional expression for grouping described below, are extracted from the binary tree database 270 and determined as a group. Then, the group is stored into the cluster database 280.

$$N_L \leq N_C < N_H \qquad (3)$$

where $N_C$ is the number of events included in the cluster C, and $N_L$ and $N_H$ are parameter constants. It is to be noted that the event number, that is, the number of events, is a value indicative of a temporal collection and represents the number of events of contents included in one cluster. In particular, where the date of image pickup is different among many of image contents included in one cluster, the event number indicates a high value and the cluster has a great event number. On the other hand, even if a large number of image contents are included on one cluster, if the date of image pickup is same among the image contents, then the value of the event number is one and the cluster has a small cluster number. It is to be noted that the event number can be determined based on image pickup time and so forth of contents corresponding to content IDs of a content list included in the cluster data.

Further, for example, if the parameter coefficients $N_L$ and $N_H$ are set to comparatively low values, then a cluster having a comparatively small event number is extracted. On the other hand, if the parameter coefficients $N_L$ and $N_H$ are set to comparatively high values, then a cluster having a comparatively great event number is extracted. Further, if the parameter coefficients $N_L$ and $N_H$ are set such that the values thereof have a small difference therebetween, then since only those clusters whose event numbers are comparatively near to each other are extracted, the number of extracted clusters is comparatively small. On the other hand, if the parameter coefficients $N_L$ and $N_H$ are set such that the values thereof have a great difference, then since also those clusters whose event numbers are different by a comparatively great amount are selected, the number of extracted clusters is comparatively great. It is to be noted that the method of extracting clusters from binary tree structure data in this instance is similar to that of the method wherein the expression (2) is used for extraction.

In this manner, clusters whose event number $N_C$ falls within the range between the parameter coefficients $N_L$ and $N_H$ are extracted and outputted as a group. It is to be noted that the parameter coefficients $N_L$ and $N_H$ may be set in advance.

Alternatively, the parameter coefficients $N_L$ and $N_H$ may be set suitably by the user by moving the grouping condition setting bar 121 displayed on the display section 120 to vary the value of the parameter coefficient $N_L$ and moving the grouping condition setting bar 122 to vary the value of the parameter coefficient $N_H$. Or else, one of the parameter coefficients $N_L$ and $N_H$ may be set.

Figure 16A:
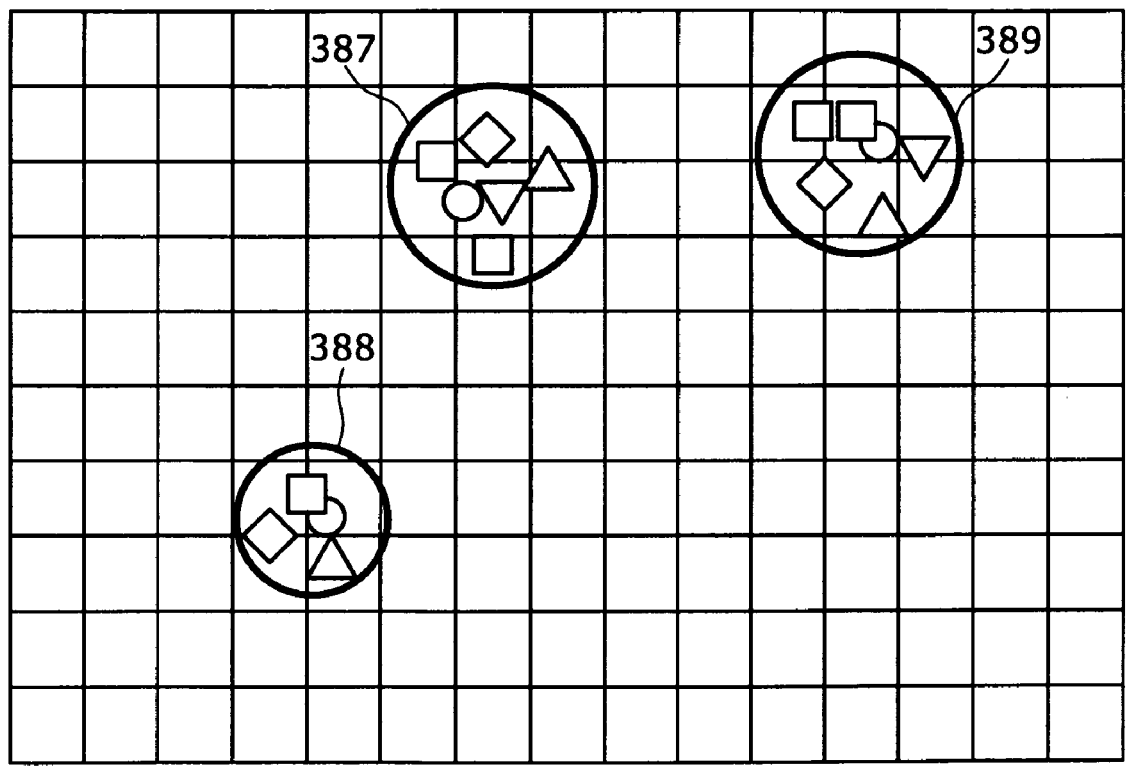
Figure 16B:

FIGS. 15 and 16B illustrate relationships between clusters corresponding to groups determined using the conditional expression for grouping given as the expression (3) and contents belonging to the cluster. It is to be noted that a circle shown in FIGS. 15, 16A and 16B represents an image picked up on October 18, that is, an event photograph dated October 18, and a square shown in FIGS. 15, 16A and 16B indicates an image picked up on December 5, that is, an event photograph dated December 5. Similarly, a rhombus and so forth in FIG. 16A indicate images picked up on days corresponding to dates of events illustrated in FIG. 16B.

For example, if, even in an area within which comparatively many clusters are distributed as seen in FIG. 15, the number of events of contents included in a cluster 386 is small (October 18 and December 5), the cluster 386 is grouped as a large cluster. On the other hand, if a comparatively high value is set as the values of the parameter coefficients $N_L$ and $N_H$, then a group corresponding to the cluster whose event number $N_C$ is comparatively great is outputted.

On the other hand, even if a plurality of contents overlap with each other at the same point or a plurality of contents exist in a small area as seen in FIG. 16A and the event data of these contents are different, the clusters are grouped as small clusters. Also, if a comparatively low value is set as the values of the parameter coefficient $N_L$ and $N_H$, a group corresponding to a cluster whose event number $N_C$ is comparatively small is outputted.

Figure 17:
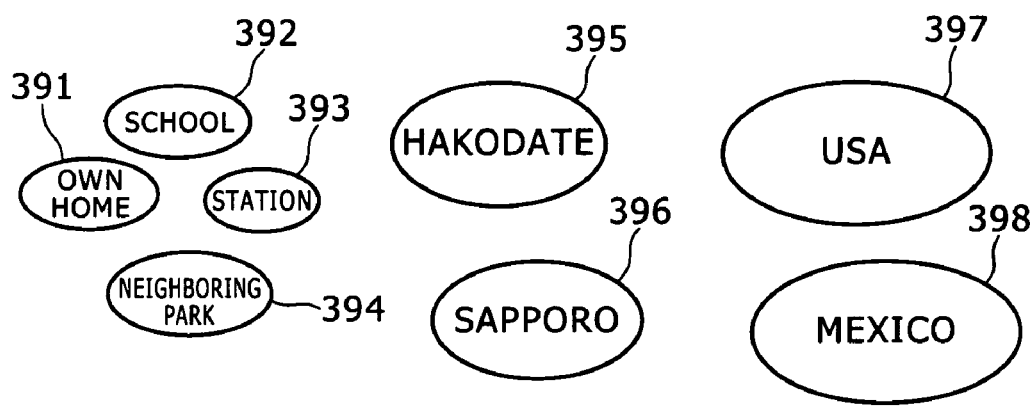
FIG. 17 is a diagrammatic view illustrating a general relationship among grouped clusters, a cluster size, a density of contents and an event number.

FIG. 17 illustrates a general relationship between grouped clusters and the cluster size, content density and event number. In FIG. 17, a name or an abbreviated name relating to a place where an image content was picked up is indicated in each of clusters 391 to 398 produced corresponding to the place. It is to be noted that the shape and the size of the clusters 391 to 398 shown in FIG. 17 are different from actual ones but are shown for the convenience of illustration.

It is assumed that, for example, "own home", "school", "station" are "neighboring park" are places which the user visits frequently; "Hakodate" and "Sapporo" are places which the user has visited several times by journey or the like; and "USA" and "Mexico" are places which the user has visited once by journey or the like. In this instance, a cluster corresponding to a place such as the user's "own home" which the user visits in a high frequency and includes many image contents picked up in a small area and besides the number of image pickup dates is great is outputted as a group of a comparatively small cluster.

On the other hand, a cluster corresponding to a place such as "USA" which the user has visited in a low frequency and includes image contents picked up in a wide area while the number of image pickup dates is small is outputted as a group of a comparatively great cluster. Further, as regards "Hakodate" and so forth which the user has visited several times by journey or the like, a cluster of a medium size is outputted as a group.

Generally, a range of groups appropriate to a user is frequently different between a place which the user visits frequently and another place which the user has visited once by journey or the like. For example, as regards a large number of photographs of a user's child picked up in the user's own home and a neighboring park, it is in most cases desirable for the user to appreciate the photographs picked up in the user's home and the photographs picked up in the park separately from each other even if the distance between the user's own home and the park is less than 1 km. On the other hand, as regards photographs picked up during journey in Hawaii visited once, the photographs picked up on the Waikiki beach and the photographs picked up in a hotel in Honolulu do not have to be separate from each other, but the user frequently wants to appreciate the photographs all together. In such an instance, according to the embodiment of the present invention, images picked up by the user can be classified readily into groups appropriate to the user. Consequently, appropriate groups of contents according to the liking of the user can be displayed.

Figure 18A:
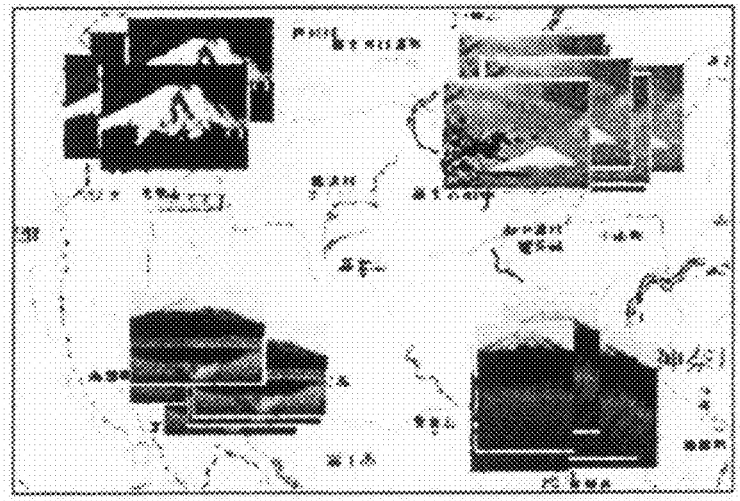
FIGS. 18A, 18B and 19 are schematic views showing different examples of a display image where grouped image contents are displayed.
Figure 18B:
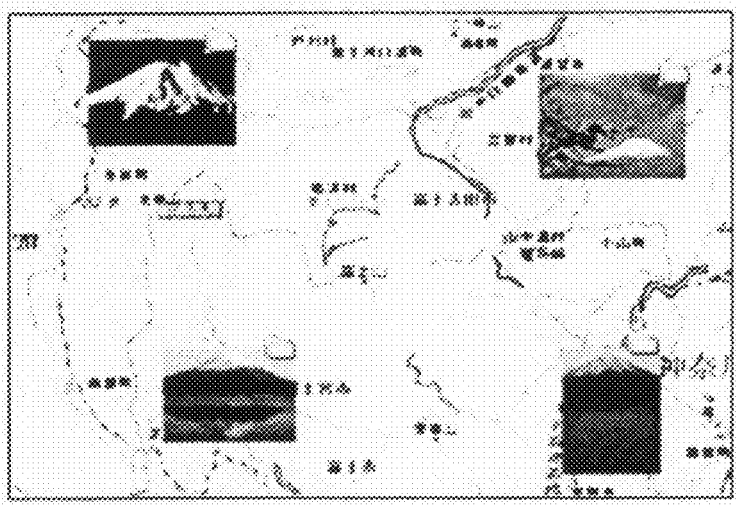
Figure 19:
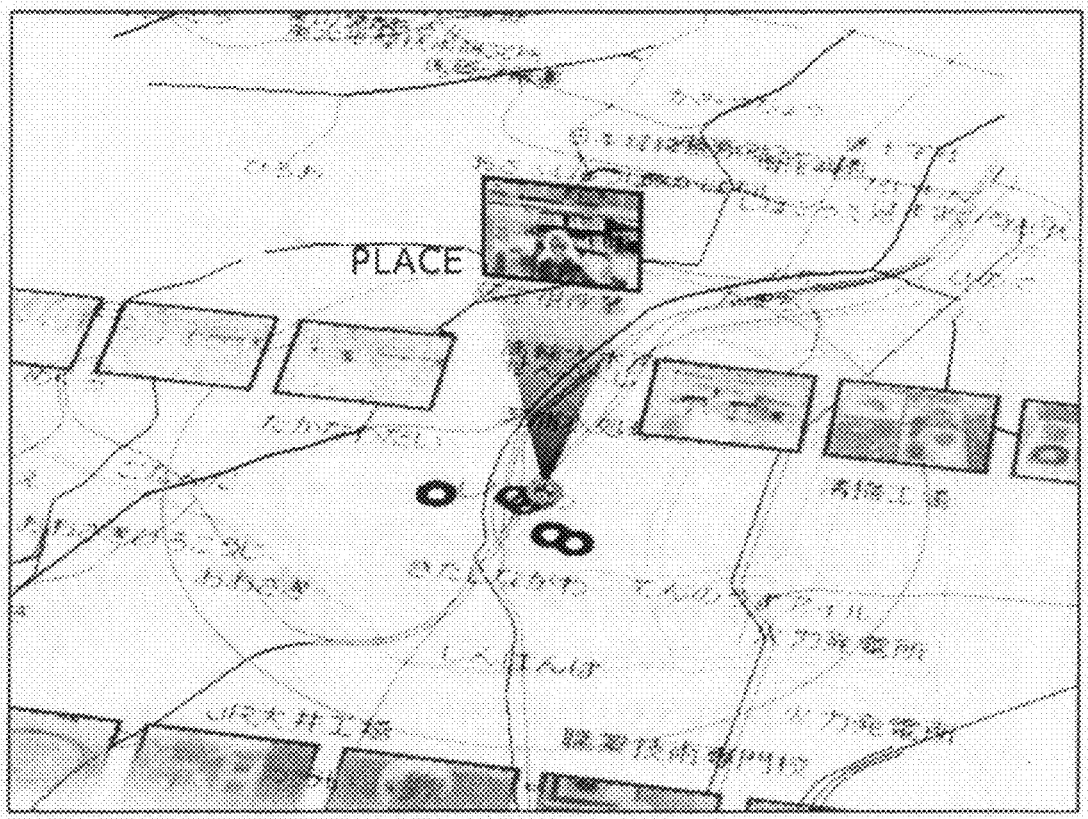

FIGS. 18A, 18B and 19 illustrate examples of display where grouped image contents are displayed. As described hereinabove, clusters outputted as groups from binary tree structure data are stored into the cluster database 280. Then, based on cluster data corresponding to the clusters stored in the cluster database 280, the image contents recorded in the pickup image database 230 are classified and displayed. In other words, the image contents belonging to the clusters stored in the cluster database 280 are displayed for individual clusters. For example, FIGS. 18A and 18B illustrate different examples wherein image contents belonging to clusters stored in the cluster database 280 are displayed in a classified state for individual clusters at a left upper portion, a left lower portion, a right upper portion and a right lower portion on a map. It is to be noted that FIG. 18A illustrates an example wherein a plurality of image contents belonging to one cluster are displayed in a partly overlapping relationship while FIG. 18B illustrates another example wherein only one image content from among a plurality of image contents belonging to one cluster is displayed and a folder icon is displayed additionally at a right upper portion of the displayed image content. By adjusting the parameter constants, a user interface which the user can appreciate readily can be provided by displaying a plurality of grouped image contents without partial overlapping thereof and adding a folder icon to a predetermined portion.

Meanwhile, FIG. 19 illustrates a different example wherein image contents which belong to clusters stored in the cluster database 280 are displayed in a classified state for the individual clusters along rows at a middle portion and a lower portion on a map. In the example of FIG. 19, the image contents are classified in the clusters with reference to the place, and a row of clusters selected by the user is displayed at a middle portion. Further, an image selected by the user in the cluster row is displayed at the center of the map.

Where image contents are displayed in a classified state as seen in FIG. 18A, 18B or 19, if the parameter constants of a grouping condition are changed by an operation input from the operation acceptance section 130, then the image contents are classified based on clusters outputted based on the parameter constants after changed. Therefore, the display image varies in response to the change of the parameter constants by the operation input from the operation acceptance section 130. By changing the parameter constants in this manner, image contents within a suitable range can be provided readily to the user.

Now, action of the clustering method and the cluster data production method described above is described with reference to the drawings.

Figure 20:
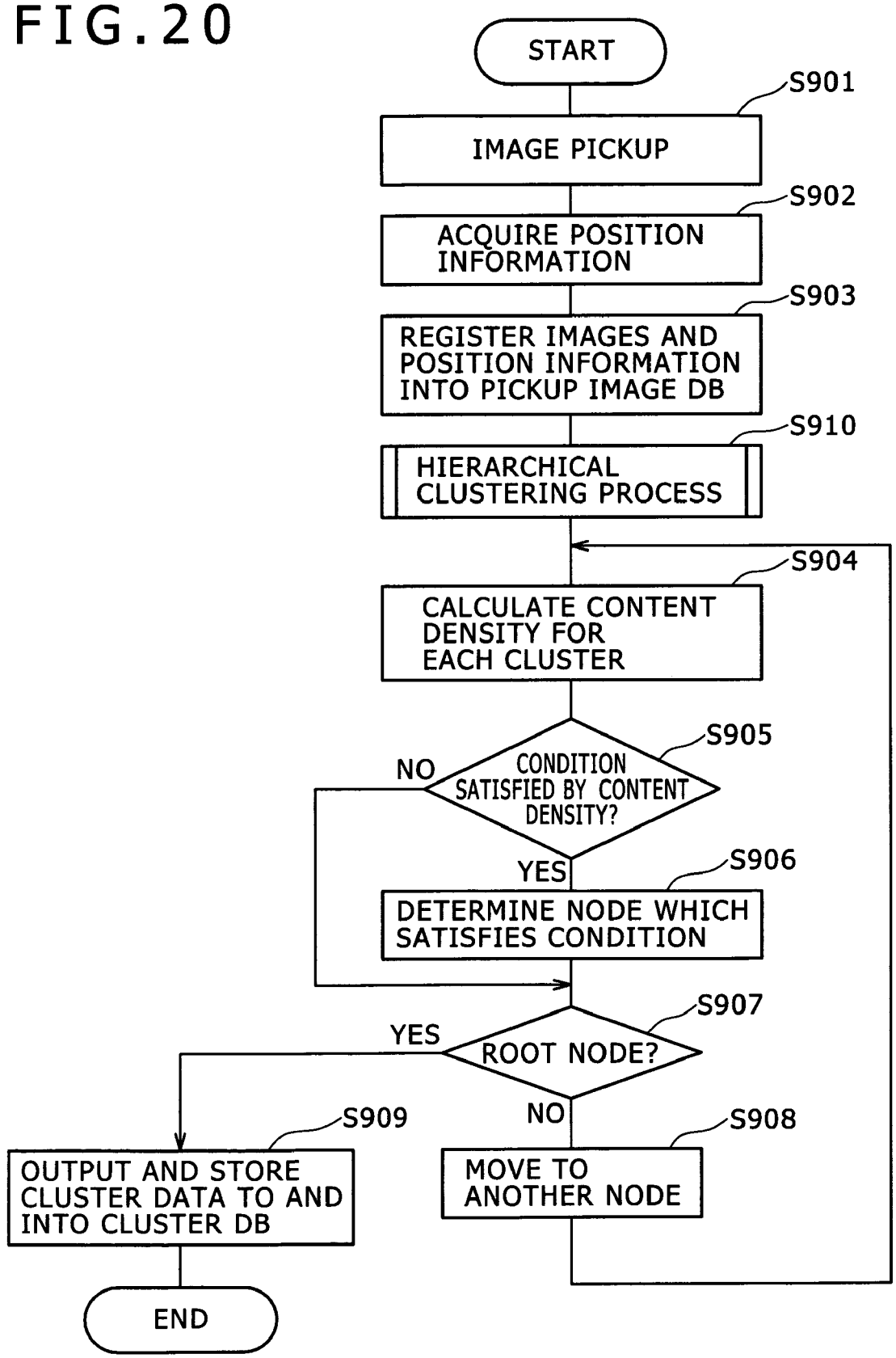
FIG. 20 is a flow chart illustrating a processing procedure of a cluster data production process by the image pickup apparatus.

FIG. 20 illustrates a processing procedure of the cluster data production process by the image pickup apparatus 100. In FIG. 20, the action after photographic images are picked up until cluster data are stored into the cluster database is illustrated. It is to be noted that, while a large number of clustering methods are available, hierarchical clustering which is a popular clustering algorithm is used in the action here. Further, grouping of clusters here is executed based on the cluster density.

First, digital data corresponding to picked up image data are converted into digital data by the capture section 212 and the resulting digital data are outputted to the pickup image database 230 at step S901. Then, position information is acquired by the GPS signal processing section 220 at step S902, and the image data in the form of digital data corresponding to the picked up images are recorded into the pickup image database 230 at step S903. In this instance, various metadata such as position information and image pickup time calculated by the GPS signal processing section 220 are recorded into the Exif tag of the contents.

Then, a hierarchical clustering process for the contents recorded in the pickup image database 230 is executed at step S910. The hierarchical clustering process is hereinafter described in detail with reference to FIG. 21.

Then, the content density of the clusters produced by the hierarchical clustering process is calculated at step S904. In particular, the content density is calculated with regard to clusters corresponding to nodes of the binary tree structure data stored in the binary tree database 270.

Then, based on the calculated content densities, it is decided whether or not the cluster density of one of clusters corresponding to nodes of the lowermost hierarchy in the binary tree structure data stored in the binary tree database 270 is included in the range defined by the parameter constants at step S905. If the cluster density of the cluster of the object of decision is not included in the range defined by the parameter constants at step S905, then it is decided at step S907 whether or not the node corresponding to the cluster is the root node. Then, if the node is the root node at step S907, then the cluster corresponding to the determined node is extracted, and cluster data corresponding to the cluster are outputted to and recorded into the cluster database 280 at step S909. The operation of the cluster data production process ends therewith.

On the other hand, if the node corresponding to the cluster is not the root node at step S907, then the object of decision is changed to a node different from the node corresponding to the cluster at step S908. Then, the content density of the different node is calculated at step S904, and it is decided at step S905 whether or not the cluster density is included in the range defined by the parameter constants. It is to be noted that, when the object of decision is changed to a different node, the node is successively changed from a node of a lower hierarchy to another node of a higher hierarchy.

If the cluster density of the cluster of the object of decision is included in the range defined by the parameter constants at step S905, then it is decided at step S906 that the node corresponding to the cluster is a node which satisfies the grouping condition. Then, it is decided at step S907 whether or not the determined node is the root node.

The node determination process of binary tree structure data is repeated in this manner at step S904 to step S908. In other words, whether or not the cluster density is included in the range defined by the parameter constants is successively decided beginning with a node of a lower hierarchy of the binary tree structure data.

Figure 21:
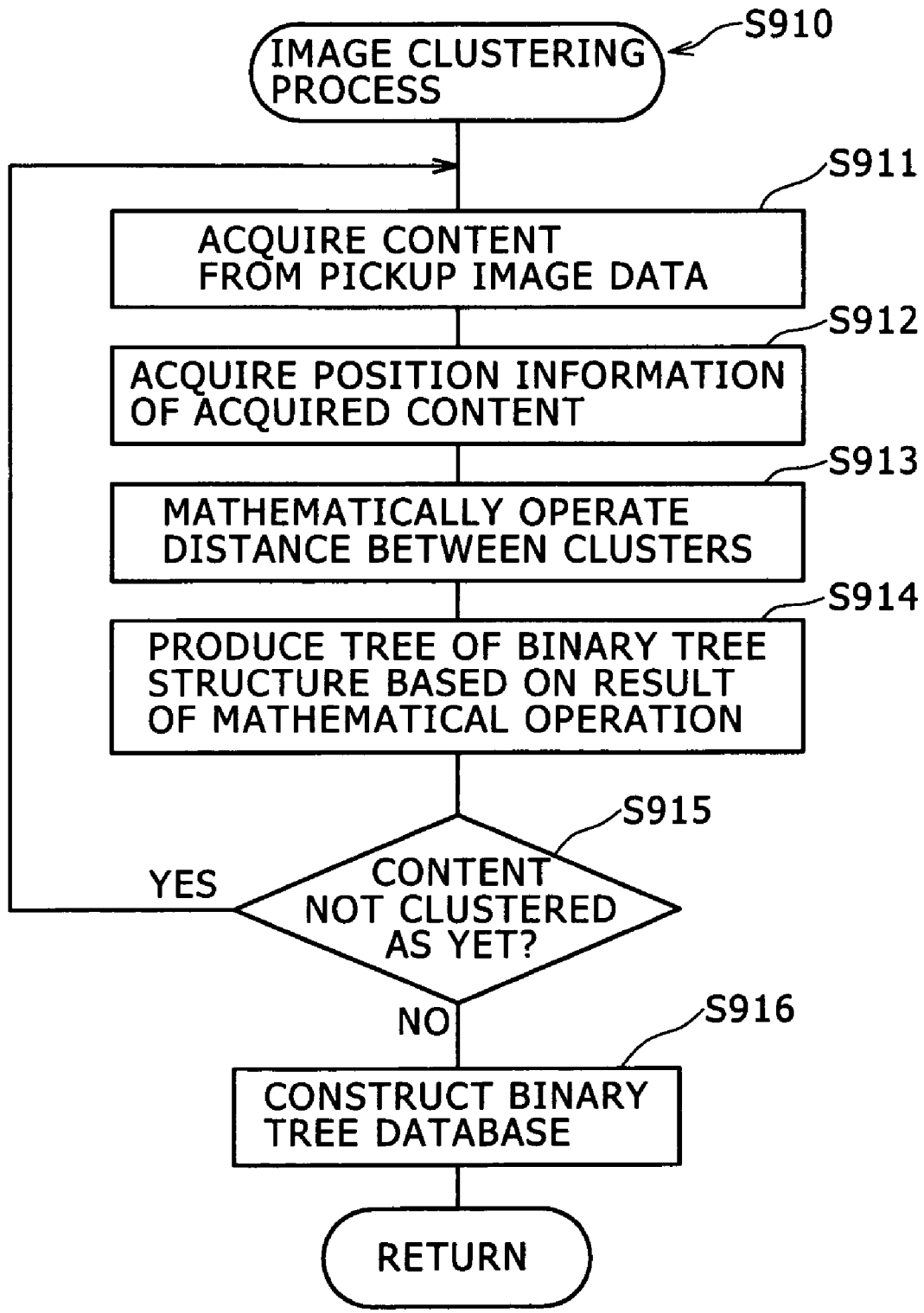
FIG. 21 is a flow chart illustrating a hierarchical clustering processing procedure from within the processing procedure of the cluster data production process by the image pickup apparatus.

FIG. 21 illustrates the hierarchical clustering processing procedure, that is, the processing procedure at step S910 illustrated in FIG. 20, from within the processing procedure for cluster data production by the image pickup apparatus 100. It is to be noted that various calculation methods are available for calculation of the distance between clusters at step S913. For example, a centroid method, a shortest distance method, a longest distance method, an inter-group mean distance method, the Ward method and so forth are known widely. While the calculation method described hereinabove with reference to FIGS. 4A to 4C is used in the following description, another calculation method may be used in response to the content.

Referring to FIG. 21, contents are acquired from the pickup image database 230 first at step S911. Then, image pickup position information registered in the Exif tag of the acquired contents is acquired at step S912. Then, the distance between the contents is calculated based on the acquired image pickup position information at step S913. Then, clusters are produced based on the distances between the clusters determined by the calculation. Thereafter, the distance between the clusters and between the contents is successively calculated, and binary tree structure data are produced based on results of the calculation at step S914. For example, binary tree structure data corresponding to the binary tree shown in FIG. 10 are produced.

Then, it is decided at step S915 whether or not there remains a content which is not clustered as yet. If some content which is not clustered as yet remains, then the processing advances to step S911. Consequently, the binary tree production process at steps S911 to S915 is repeated. It is to be noted that a production method other than the binary tree production process at steps S911 to S915 in a case wherein there remains a content which is not clustered after binary tree structure data are produced is hereinafter described in detail with reference to FIGS. 25 to 28.

If a content which is not clustered as yet remains at step S915, then the produced binary tree structure data are stored into the binary tree database 270 at step S916, and the action of the hierarchical clustering processing procedure ends therewith.

Now, the hierarchical clustering method is described in detail below with reference the drawings.

In a basic flow of the hierarchical clustering method described below, all input data are first operated so as to belong to different clusters from each other similarly as in an aggregation type hierarchical clustering in the past such as the shortest distance method. In particular, one element is included into one cluster. Then, two clusters the distance between which is smallest are successively merged until the input data are finally merged into one cluster.

It is to be noted that the principal difference between the hierarchical clustering method in the embodiment of the present invention and the hierarchical clustering method in the past resides in the calculation method of a representative value of each cluster and the distance between clusters.

Here, where the total number of input data is n, clusters are set such that input data belongs as one element to one cluster, and totaling n clusters are produced. It is to be noted that each cluster has, as attribute values, the center point C and the radius r, and the initial value of the center point C is coordinate values of the data and the initial value of the radius r is zero.

Then, the center point C and the radius r are determined such that, for all elements belonging to each cluster, the distance from the center point C to the elements becomes smaller than the radius r. Consequently, all elements belonging to the cluster are included inside of a sphere defined by the center point C and the radius r.

The distance between clusters is determined in the following manner.

Where a cluster i and another cluster j are merged to produce a cluster k, the distance d(i,j) between the cluster i and the cluster j can be determined by the following expressions (4) and (5):

$$d(i,j) = r(k) - r(i) - r(j) \quad (r(k) \geq r(i) + r(j)) \qquad (4)$$

$$d(i,j) = 0 \quad (r(k) < r(i) + r(j)) \qquad (5)$$

where r(i) is the radius of the cluster i. Thus, the distance between clusters is an increment to the radius where the clusters are merged.

The method of determining the increment to the distance as a distance between clusters is similar to a way of thinking of the Ward method. In the Ward method, the following expression (6) is used to determine the distance d(i,j) between the cluster i and the cluster j:

$$d(i,j) = E(k) - E(i) - E(j) \qquad (6)$$

where E( ) is a square error of the elements included in the cluster.

Now, a method of determining the center point and the radius of a cluster formed by merging of two clusters is described.

Figure 22A:
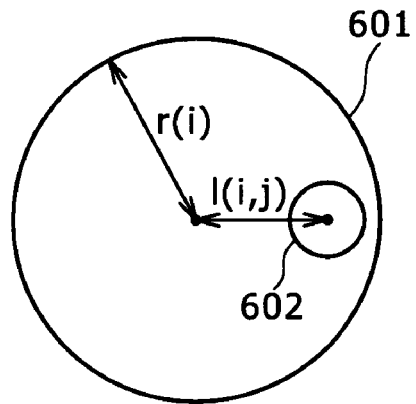
FIGS. 22A, 22B and 22C are diagrammatic views illustrating different inclusion relations of elements which belong to individual clusters where two clusters are to be merged.
Figure 22B:
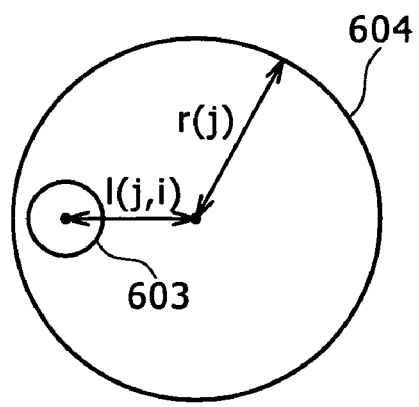
Figure 22C:
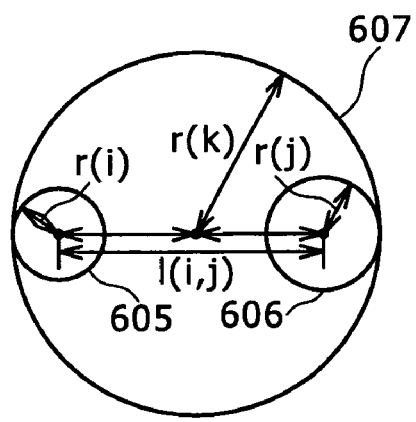

FIGS. 22A to 22C are diagrammatic views illustrating different inclusion relations of elements which belong to individual clusters where two clusters are to be merged.

Where two clusters are merged, three patterns are available including patterns (1) to (3) given below based on the inclusion relationship of elements which belong to the clusters:

(1) m(i) ⊃ m(j)
(2) m(j) ⊃ m(i)
(3) other than the two cases where m(i) is a set of all elements which belong to m(i), and m(j) is a set of all elements which belong to m(j).

m(i) ⊃ m(j) of the pattern (1) above indicates that all elements which belong to the cluster j (602) belong to the cluster i (601) as seen in FIG. 22A.

m(j) ⊃ m(i) of the pattern (2) above indicates that all elements which belong to the cluster i (603) belong to the cluster j (604) as seen in FIG. 22B.

The pattern (3) corresponds to any other than the patterns (1) and (2) and may be, for example, a pattern wherein the inclusion relationship of the cluster i (605) and the cluster j (606) is such as illustrated in FIG. 22C.

Distribution to the three patterns (1) to (3) is determined based on the coordinates of the center point and the radius of the cluster i and the cluster j. For example, if a sphere of a radius r(i) from the coordinate C(i) of the center point of the cluster i includes the entirety of the cluster j formed from a sphere having the center point at the coordinate C(j) and a radius (j), the relationship of the pattern (1) is satisfied as seen in FIG. 22A.

In other words, if $r(i) \geq r(j) + l(i,j)$ is satisfied, then the relationship of the pattern (1) is satisfied. Here, l(i,j) is the Euclid distance between the center points of the cluster i and the cluster j as given by the following expression (7):

$$l(i,j) = |C(i) - C(j)| \qquad (7)$$

Here, where the dimension of the data is represented by dim, l(i,j) is represented by the following expression (8):

$$l(i,j) = \sqrt{\sum_{k=1}^{dim} (c(i,k) - c(j,k))^2} \qquad (8)$$

where c(i,k) is the kth value of the center value attribute of the cluster i.

For the center point and the radius of the cluster k after the merging, those of the cluster i are used as they are.

For the pattern (2) above, the center point and the radius of the cluster k can be determined similarly with "i" and "j" exchanged for each other in the case of the pattern (1) described above.

For the pattern (3) above, a cluster k (607) is produced from a minimum sphere which includes the sphere of the cluster i (605) and the sphere of the cluster j (606) as shown in FIG. 22C. The radius of the cluster k (607) can be determined in accordance with the expression (9) given below while the center point of the cluster k can be determined in accordance with the expression (10) given below:

$$r(k) = (l(i,j) + r(i) + r(j))/2 \qquad (9)$$

$$C(k) = ((r(i) - r(j) + l(i,j)) * C(i) + (r(j) - r(i) + l(i,j)) * C(j))/(2 * l(i,j)) \qquad (10)$$

It is to be noted that the center point of the cluster k exists on a straight line interconnecting the center points C(i) and C(j).

Now, the clustering process described hereinabove is described in detail with reference to the drawings in connection with a case wherein n data are inputted actually.

Figure 23:
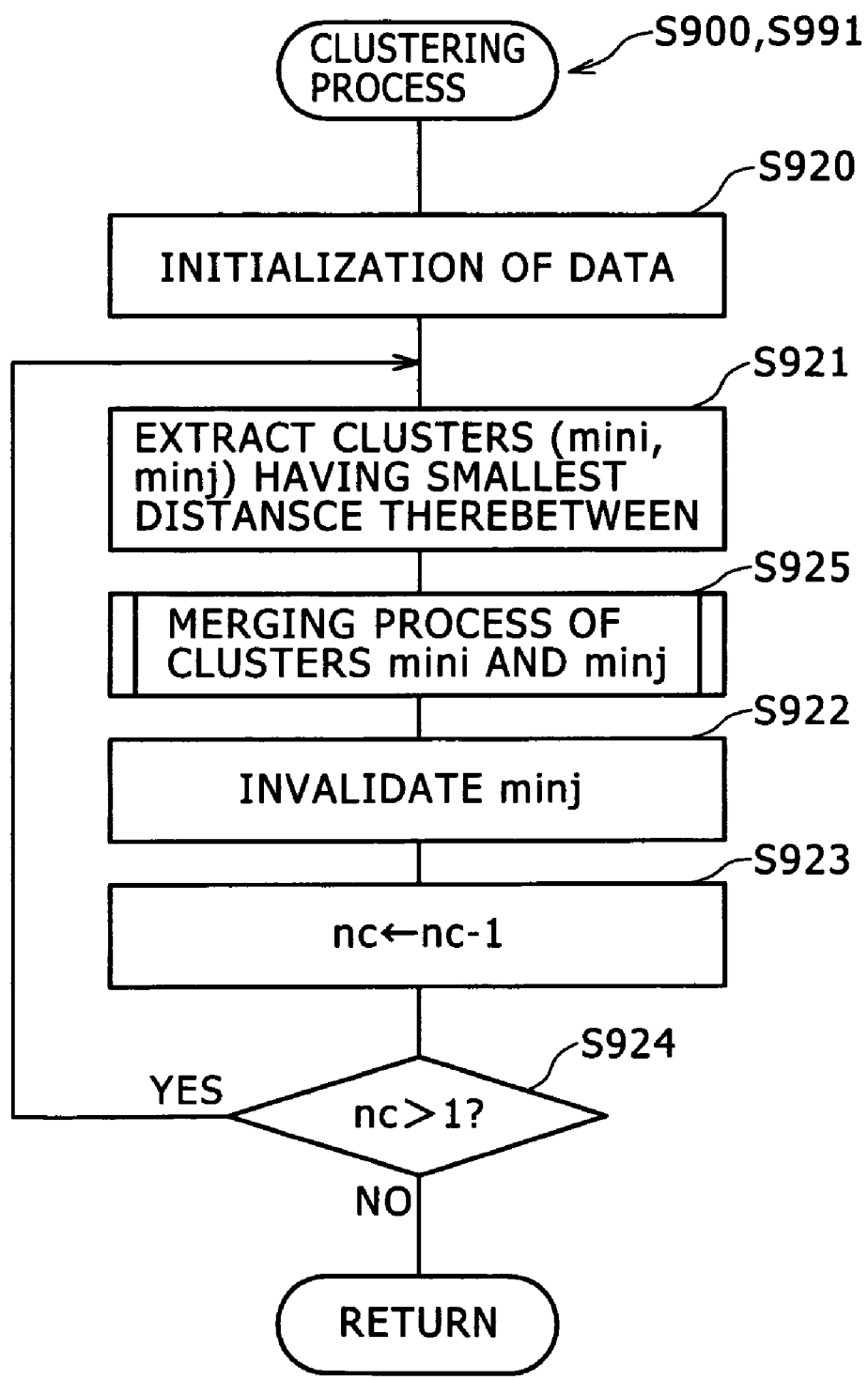
FIG. 23 is a flow chart illustrating a processing procedure of a clustering process by the image pickup apparatus.

FIG. 23 illustrates a processing procedure of the clustering process by the image pickup apparatus 100. In the process, n data X(i) (i=0, ... [0], n−1) of the dim dimension inputted are clustered. Further, the working region is set to:

n center values of dim dimension: C(i) (i=0, ... [0], n−1)
n radii: r(i) (i=0, ... [0], n−1)
n flags: flg(i) (i=0, ... [0], n−1)

First, the element number n is initialized to a cluster number nc, the center value of all clusters is initialized to coordinates of the individual elements, the radius of all clusters is initialized to zero, and the validity flag flg(i) of the clusters is initialized as given below at step S920.

$$C(i) = X(i) \quad (i=0, \ldots, n-1)$$

$$r(i) = 0 \quad (i=0, \ldots, n-1)$$

$$flg(i) = \text{true} \quad (i=0, \ldots, n-1)$$

$$nc = n$$

Then, a combination of clusters the distance between which is shortest is extracted from among the n clusters C(i) at step S921. In this instance, i and j with which d(i,j) (i=0, ..., n−1, j=0, ..., n−1, i<j) is shortest where both of the flags flg(i) and flg(j) are "true" are represented by mini and minj, respectively.

Thereafter, the clusters mini and minj determined in this manner are merged at step S925. The merging process of clusters is hereinafter described in detail with reference to a flow chart shown in FIG. 24. After the merging process, the validity flag flg(minj) corresponding to the cluster minj is changed to invalid (false) at step S922.

Then, the cluster number nc is decremented by "1" at step S923, and it is decided whether or not the cluster number nc is greater than "1" at step S924. If the cluster number nc is greater than "1" at step S924, then the processing advances to step S921 so that the clustering process is repeated at steps S921 to S923. However, if the cluster number nc is equal to or lower than "1" at step s924, then the action of the clustering process is ended.

Figure 24:
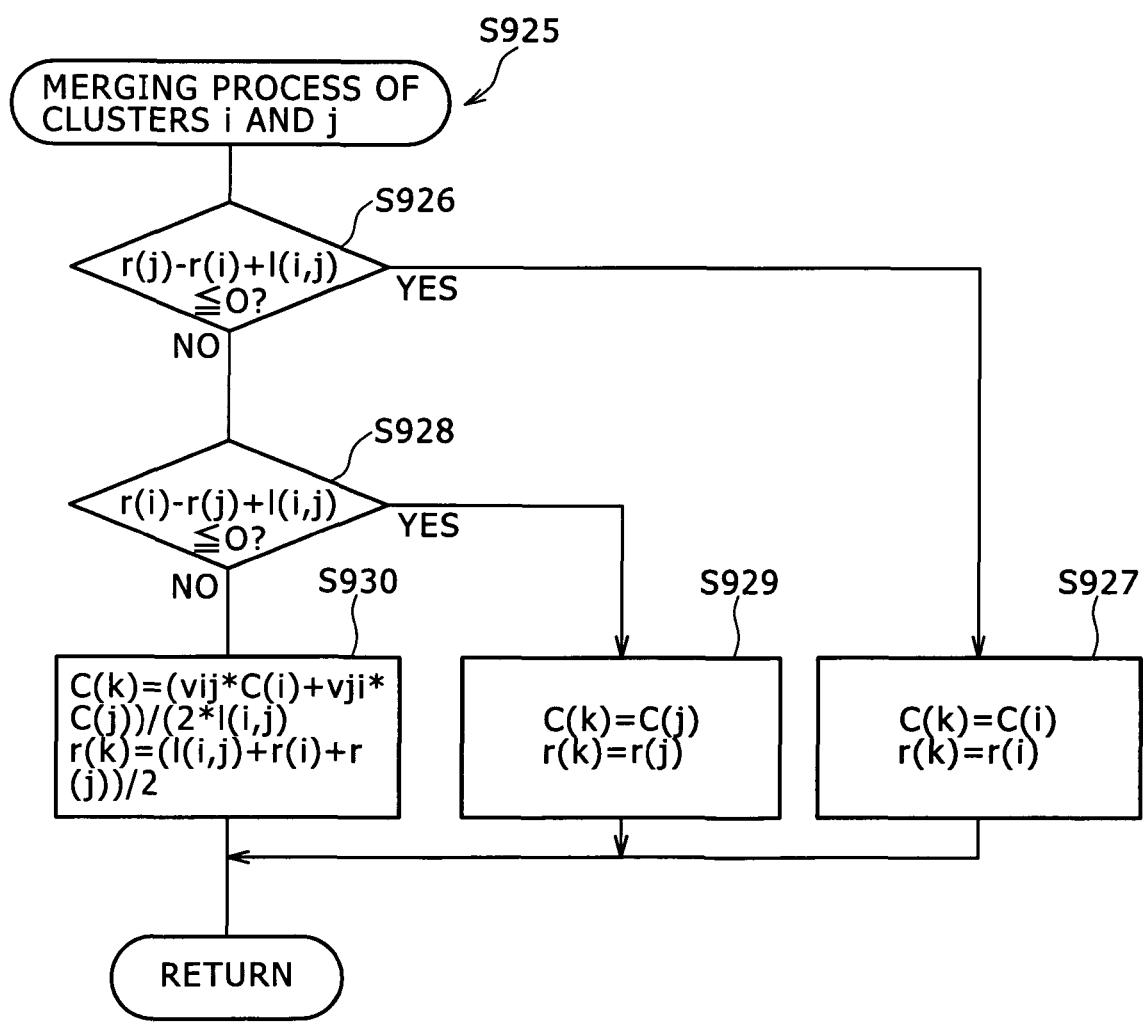
FIG. 24 is a flow chart illustrating a merging processing procedure of clusters from within the processing procedure of the clustering process.
Figure 25:
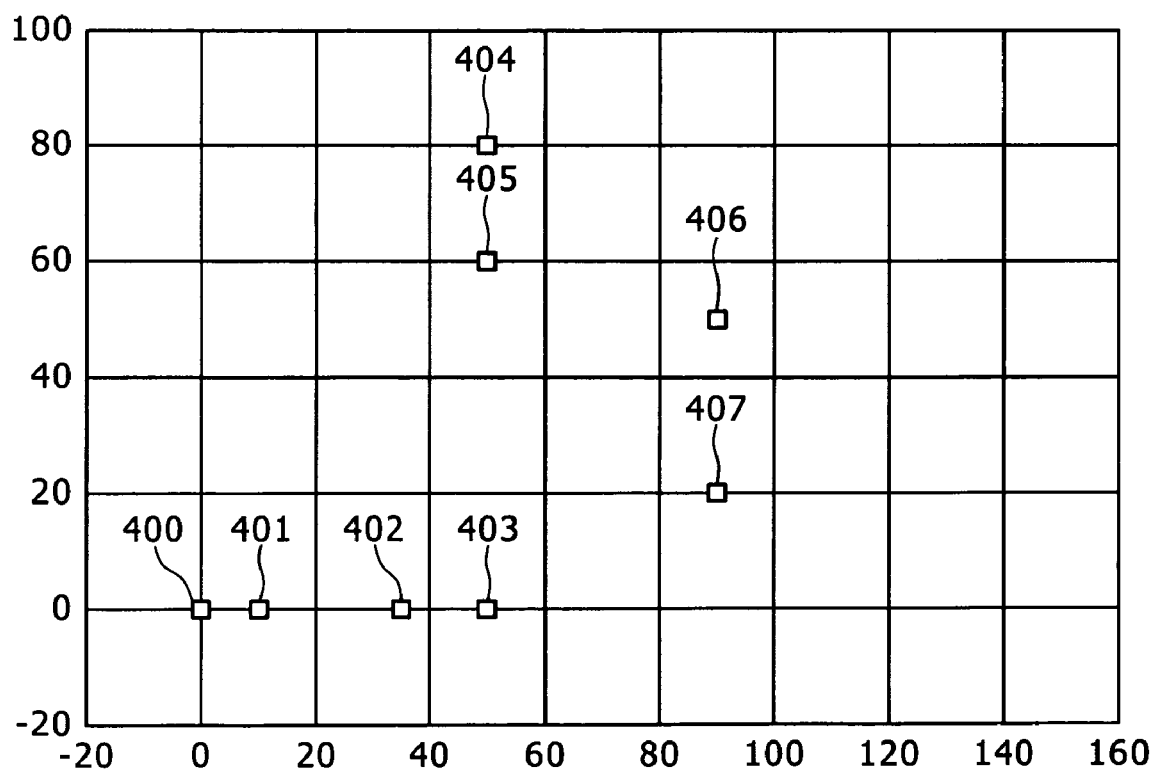
FIGS. 25 to 32 are diagrammatic views illustrating a process of transition where eight data disposed on an xy coordinate system are to be clustered.

FIG. 24 illustrates a cluster merging processing procedure, that is, the processing procedure at step S924 illustrated in FIG. 23, from within the processing procedure of the clustering process by the image pickup apparatus 100. In the present process, the center point C(k) and the radius r(k) of the cluster after merged is determined where i is "mini", j is "minj" and k is "mini".

First, it is determined at step S926 whether or not "vji=r(j)−r(i)+l(i,j)" is equal to or lower than "0". If "vji=r(j)−r(i)+l(i,j)" is equal to or lower than "0" at step S926, then the center point C(k) and the radius r(k) are set to C(k)=C(i) and r(k)=r(i), respectively, at step S927.

On the other hand, if it is determined at step S926 that "vji=r(j)−r(i)+l(i,j)" is not equal to or lower than "0", then it is decided at step S928 whether or not "vij=r(i)−r(j)+l(i,j)" is equal to or lower than "0". If "vij=r(i)−r(j)+l(i,j)" is equal to or lower than "0" at step S928, then the center point C(k) and the radius r(k) are set to C(k)=C(j) and r(k)=r(j), respectively, at step S929.

If "vij=r(i)−r(j)+l(i,j)" is not equal to or lower than "0" at step S928, then the center point C(k) and the radius r(k) are set to C(k) (vij*C(i)+vji*C(j))/(2*l(i,j)) and r(k)=(l(i,j)+r(i)+r(j))/2, respectively, at step S930.

Now, a particular example where image data are clustered by the clustering process described hereinabove with reference to FIGS. 23 and 24 is described with reference to the drawings. In the particular example described below, eight data (n=8) disposed two-dimensionally (dim=2) are clustered.

FIGS. 25 to 32 illustrate a process of transition where eight data 400 to 407 disposed on an xy coordinate system are to be clustered. Meanwhile, FIGS. 33A to 39B illustrate an attribute value of individual clusters and the distance between the clusters where the data 400 to 407 are to be clustered. It is assumed that, on the xy coordinate system shown in FIGS. 25 to 32, the coordinates of the data 400 are (0,0); those of the data 401 are (10, 0); those of the data 402 are (35, 0); those of the data 403 are (51, 0); those of the data 404 are (50, 80); those of the data 405 are (50, 60); those of the data 406 are (90, 50); and those of the data 407 are (90, 20).

In tables 421, 423, 425, 427, 429, 431, 433 and 434 shown in FIGS. 33A to 39B, cluster numbers 0 to 7 of clusters where the data 400 to 407 are clustered, the radius r of the clusters, the x coordinate cx and the y coordinate cy of the center coordinates of the clusters are indicated. It is to be noted that, in those tables, the item for true/false of the validity flag flg of the clusters described above is not shown.

Meanwhile, in tables 422, 424, 426, 428, 430 and 432 shown in FIGS. 33B to 38B, the distance d(i,j) between clusters where the data 400 to 407 are clustered is indicated.

First, all of the eight data 400 to 407 disposed on the xy coordinate system are individually allocated to one cluster. In particular, as shown in FIG. 33A, the data 400 to 407 are allocated to the cluster numbers 0 to 7, respectively, and stored into the table 421 at step S920.

Then, the distance between the clusters stored in the table 421 shown in FIG. 33A is calculated, and two clusters between which the distance is shortest are extracted at step S921. The table 422 shown in FIG. 33B illustrates a result of the calculation of the distance d(i,j) between clusters. As seen in the table 422, the two clusters (mini, minj) between which the distance is smallest are clusters of the cluster numbers 0 and 1 (mini=0, minj=1) between which the distance is 5 (d(0,1)=5). Therefore, the two clusters of the cluster number 0 and the cluster number 1 are extracted.

Thereafter, the clusters of the cluster number 0 and the cluster number 1 are merged at step S924. Here, since, regarding the clusters of the cluster number 0 and the cluster number 1, l(i,j)=10, r(i)=0, r(j)=0, vij=10 and vji=10, after the merging process described hereinabove with reference to FIG. 24, the processing advances to step S929, at which the center point C(k) and the radius r(k) are determined in accordance with the following expressions:

$$C(k) = (vij*C(i) + vji*C(j))/(2*l(i, j))$$
$$= (10*C(i) + 10*C(j))/(2*10)$$
$$= \{(10*0 + 10*10)/(2*10), (0*0 + 0*10)/(2*10)\}$$
$$= (5, 0)$$

$$r(k) = (l(i, j) + r(i) + r(j))/2$$
$$= (10 + 0 + 0)/2$$
$$= 5$$

Figure 26:
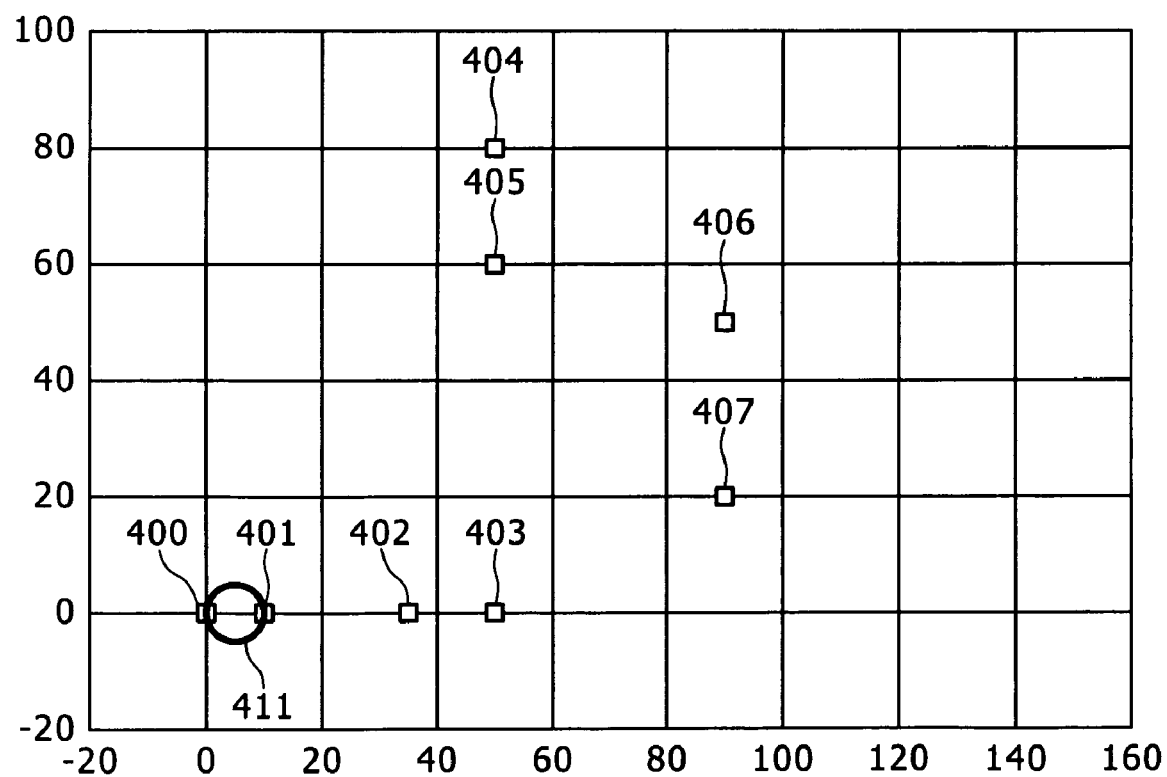

Further, k=0. Consequently, the table 423 illustrated in FIG. 34A is obtained. Further, a cluster 411 is produced as seen in FIG. 26.

Then, the cluster number nc is decremented by "1" at step S923. In other words, the cluster number nc changes from nc=8 to nc=9.

Then, it is decided at step S924 whether or not the cluster number nc is greater than "1". Since, in this instance, the cluster number nc is nc=7 and is greater than "1", the processing advances to step 921 to repeat the clustering processes at steps S921 to 922.

Figure 27:
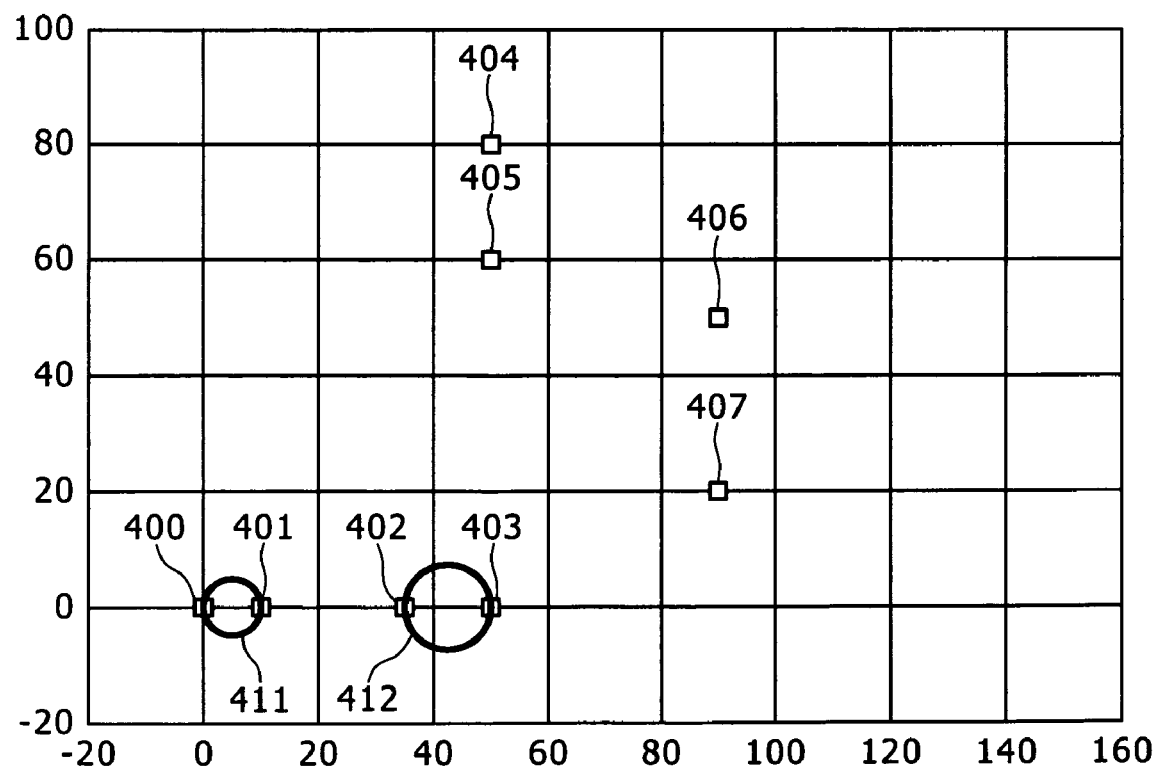

For example, the distance between the clusters stored in the table 423 of FIG. 34A is calculated as seen in the table 424 of FIG. 34B. Then, two clusters between which the distance is shortest are those of the cluster number 2 and the cluster number 3 between which the distance is 8 (d(2,3)=8) as seen from the table 424. Therefore, a cluster 412 is produced from the two clusters of the cluster number 2 and the cluster number 3 as seen in FIG. 27.

Figure 28:
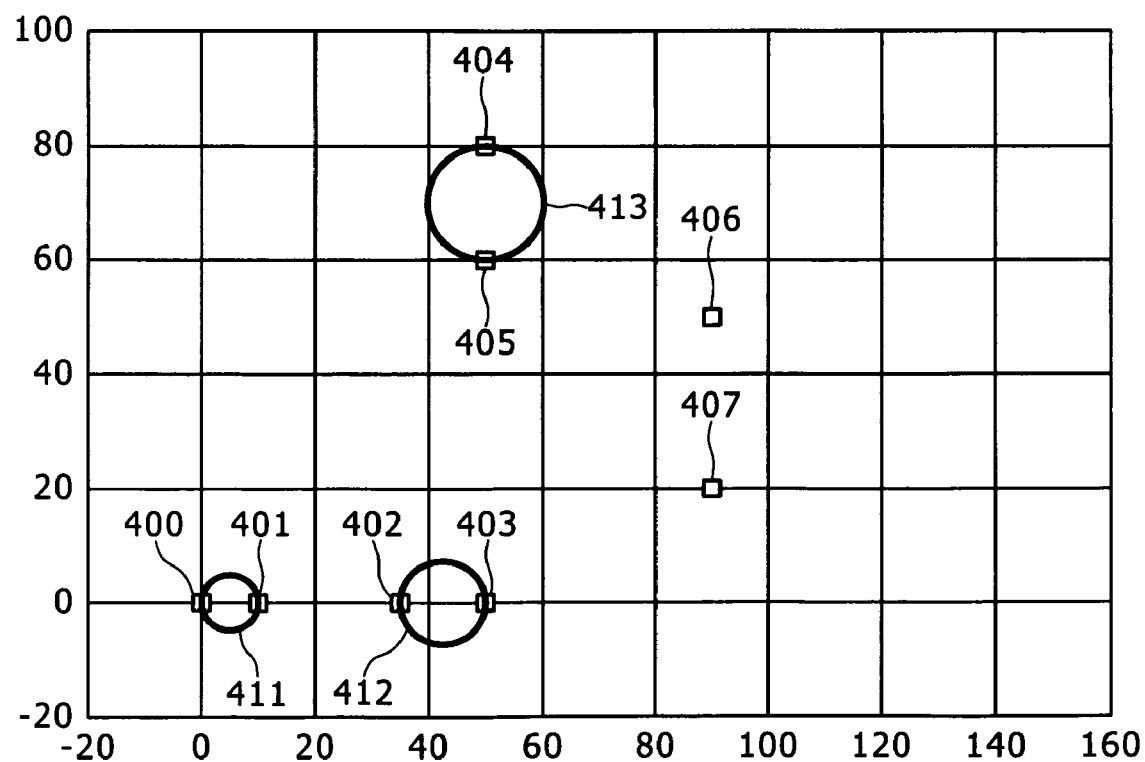

Thereafter, the distance between the clusters stored in a table 425 of FIG. 35A is calculated as seen in a table 426 of FIG. 35B. Then, two clusters between which the distance is smallest are those of the cluster number 4 and the cluster number 5 between which the distance is 10 (d(4,5)=10) as seen from the table 426. Therefore, a cluster 413 is produced from the two clusters of the cluster number 4 and the cluster number 5 as seen in FIG. 28.

Figure 29:
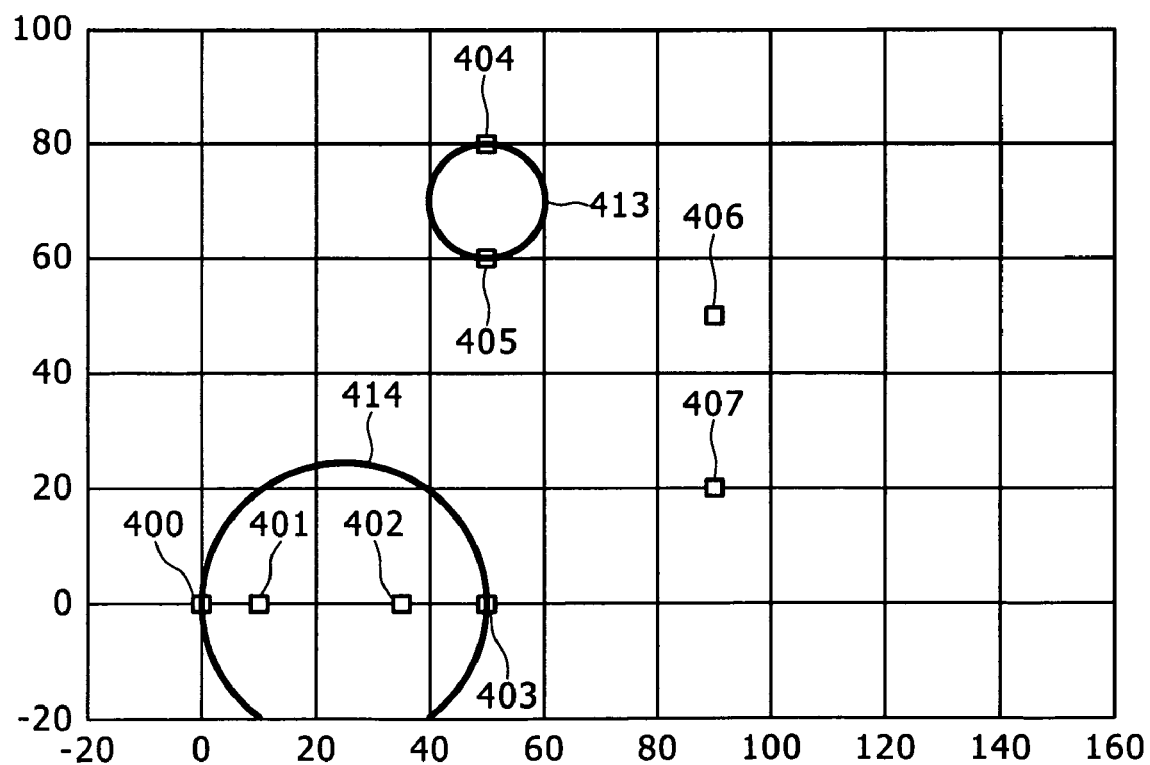

Then, the distance between the clusters stored in a table 427 of FIG. 36A is calculated as seen in a table 428 of FIG. 36B. Then, two clusters between which the distance is smallest are clusters of the cluster number 0 and the cluster number 2 between which the distance is 12.5 (d(0,2)=12.5) as seen from the table 428. Therefore, a cluster 414 is produced from the two clusters of the cluster number 0 and the cluster number 2 as seen in FIG. 29.

Figure 30:
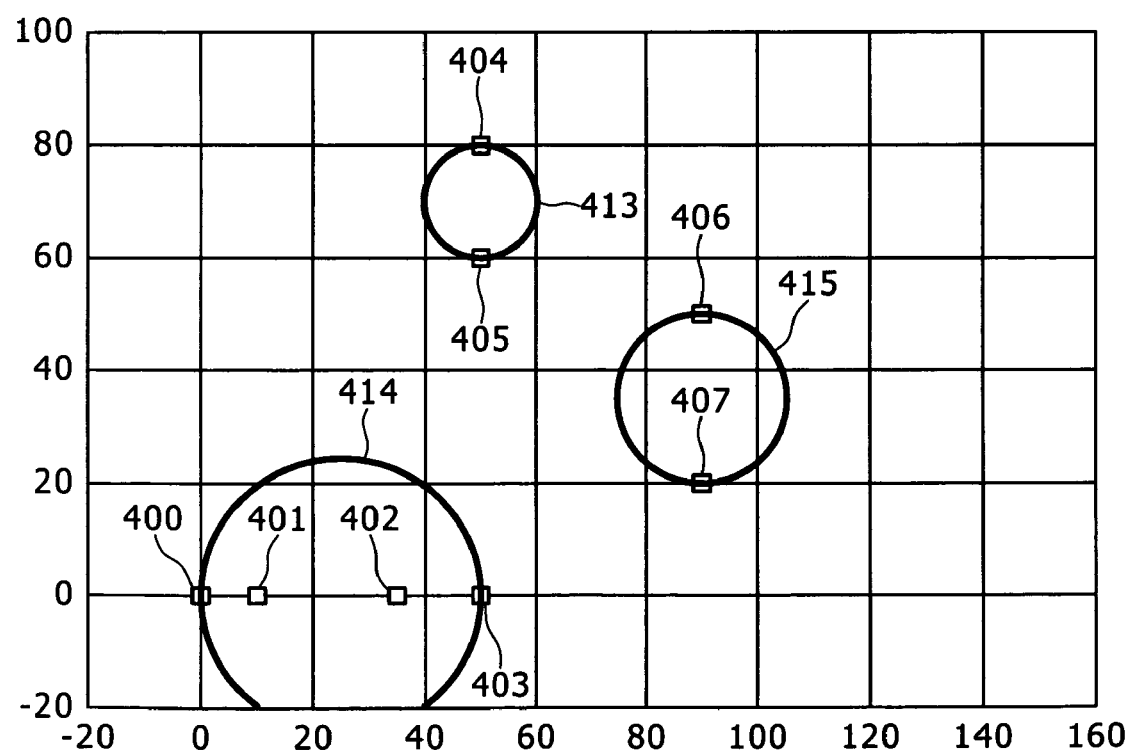

Thereafter, the distance between the clusters stored in a table 429 of FIG. 37A is calculated as seen in a table 430 of FIG. 37B. Then, two clusters between which the distance is smallest are clusters of the cluster number 6 and the cluster number 7 between which the distance is 15 (d(6,7)=15) as seen from the table 430. Therefore, a cluster 415 is produced from the two clusters of the cluster number 6 and the cluster number 7 as seen in FIG. 30.

Figure 31:
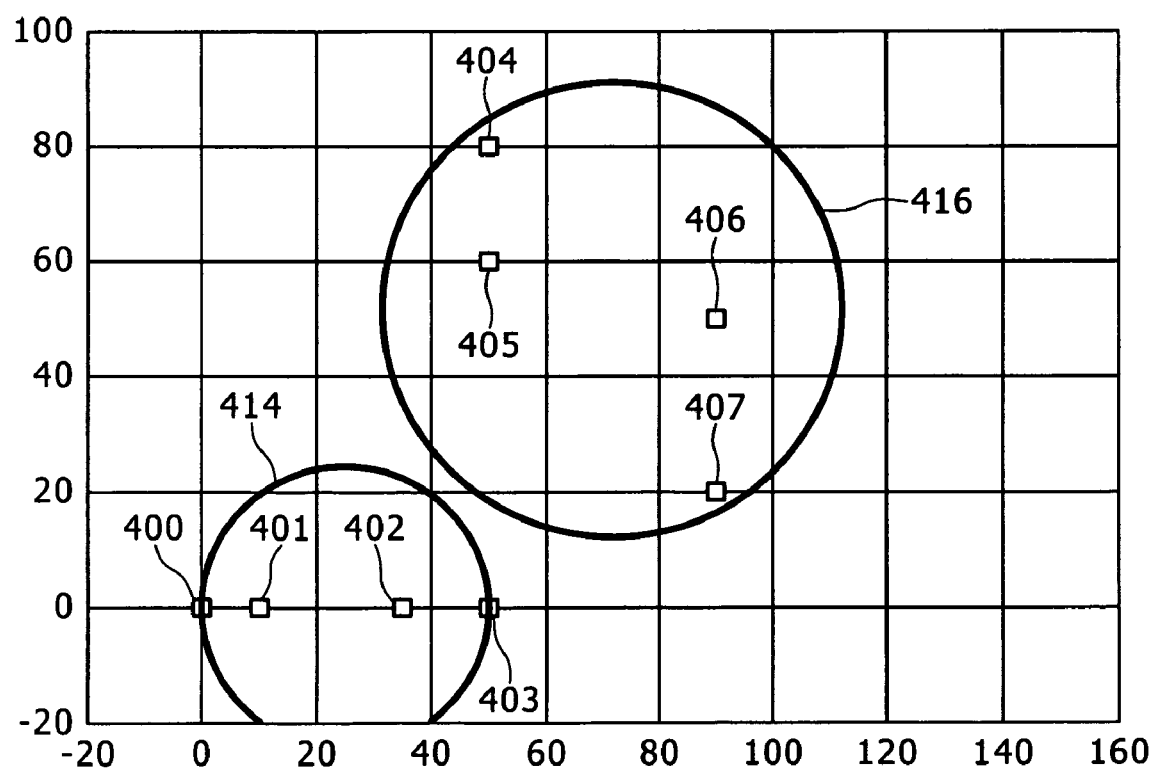

Then, the distance between the clusters stored in a table 431 of FIG. 38A is calculated as seen in a table 432 of FIG. 38B. Then, two clusters between which the distance is smallest are clusters of the cluster number 4 and the cluster number 6 between which the distance is 14.0754 (d(4,6)=14.0754) as seen from the table 432. Therefore, a cluster 416 is produced from the two clusters of the cluster number 4 and the cluster number 6 as seen in FIG. 31.

Figure 32:
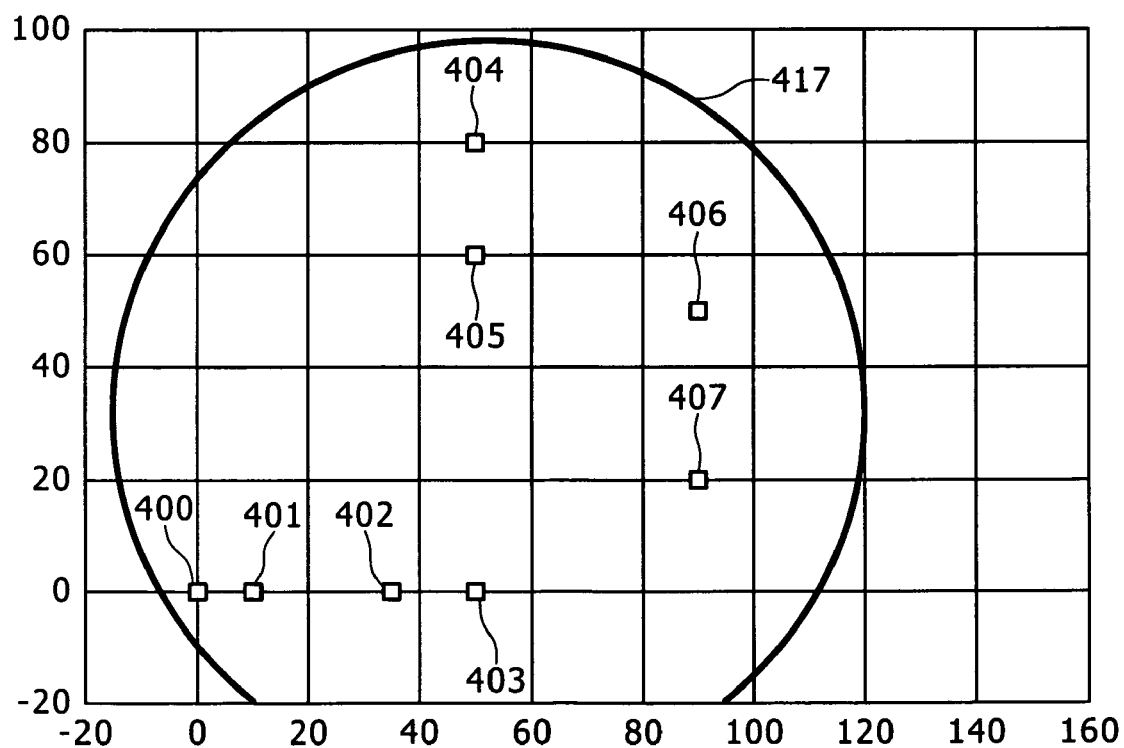

Thereafter, a cluster 417 is produced as seen in FIG. 32 from the two clusters of the cluster number 0 and the cluster number 4 which remain finally. A table 433 of FIG. 39A indicates the cluster number and the attribute values of clusters before production of the cluster 417 in a state illustrated in FIG. 31, and a table 434 of FIG. 39B indicates the cluster number and the attribute values of the clusters after production of the cluster 417.

Now, action of storing a content of image data into binary tree structure data is described in detail with reference to the drawings. In the clustering process described above, contents of image data are clustered to produce clusters, and binary tree structure data corresponding to the clusters are produced. In order to use the clustering process, by which binary tree structure data corresponding to clusters are produced, to store a new content into the binary tree structure data produced already, it is necessary to execute the clustering process also for the contents whose binary tree structure data are produced already to produce clusters and produce binary tree structure data. For example, when binary tree structure data are produced for n contents otherwise without using binary tree structure data produced already, since time of the order of the cube of n may be required, long processing time may be required. Therefore, in order to reduce the processing time, in the example described below, a method of storing a new content using binary tree structure data produced already is described.

Here, the binary tree has nodes and arcs. Each node has child nodes or leaves. Such child nodes or leaves are represented by left( ) and right( ). For example, two child nodes of a node a are indicated by left (a) and right (a). In this instance, the child node left (a) is regarded as the first child and the child node right (a) is regarded as the second child. Meanwhile, parent (a) [0] represents the parent node of the node a. Further, brother(a) indicates a brother of the node a who is the other child as viewed from the parent. In particular, if left(parent (a))=a, then brother(a) is right(parent(a)), but if right(parent (a))=a, then brother(a) is left(parent(a)). Furthermore, head (S) indicates the first element of the set S. Meanwhile, the root node of the binary tree signifies a node of the highest hierarchy. Further, center(a) indicates the center position of the cluster corresponding to the node a.

Further, each node has a radius and a center point which are attribute values of a cluster which corresponds in a one-by-one corresponding relationship to the node. For example, the radius of the cluster a corresponding to the node is represented by r(a), and the center portion of the cluster a is represented by center(a). An ultraspherical cluster represented by the radius from the center point of each node can be indicated by the attribute values of the cluster. It is to be noted that the inner side of the ultrasphere is a cluster region. Further, d(a,b) indicates the Euclid distance between the cluster a and the cluster b corresponding to the nodes.

Figure 40:
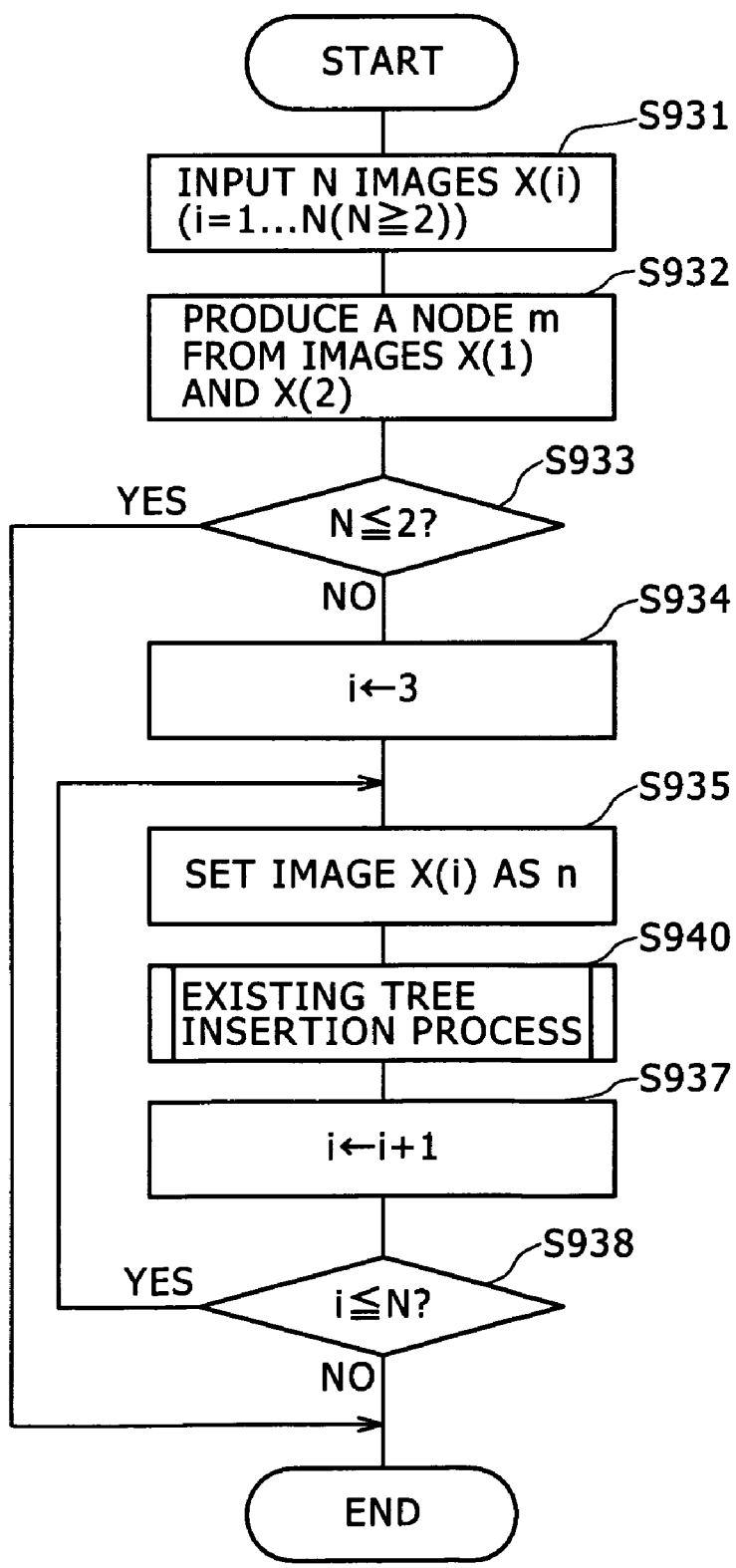
FIG. 40 is a flow chart illustrating a processing procedure of a binary tree production process by the image pickup apparatus.

FIG. 40 illustrates a processing procedure of the binary tree production process by the image pickup apparatus 100. In the present example of the processing procedure, N ($\geq$2) images X(i) (i=0, . . . , N) are inputted as input data, and then the N images X(i) are outputted as binary tree structure data obtained by clustering the N images X(i).

First, N images X(i) are inputted at step S931. Then, a node m whose child nodes are the image X(1) and the image X(2) which are first and second ones of the inputted N images X(i) is produced at step S932. In other words, the child node left(m) of the node m is the image X(1) and the child node right(m) of the node m is the image X(2).

Then, it is decided at step S933 whether or not N is equal to or lower than "2". If N is equal to or lower than "2", then the production of binary tree structure data is ended. On the other hand, if N is not equal to or lower than "2" at step S933, then i is set to three at step S934. Thereafter, the image X(i) is set to the node n at step S935, and then an existing tree insertion process is executed at step S940. The existing tree insertion process is hereinafter described in detail with reference to FIG. 41.

Then, i is incremented by "1" at step S937. Then, it is decided at step S938 whether or not i$\leq$N. If i$\leq$N, then the processes at the steps beginning with step S935 are repeated.

On the other hand, if i$\leq$N is not satisfied at step S938, that is, if i>N, then the operation of the binary tree production process is ended.

Figure 41:
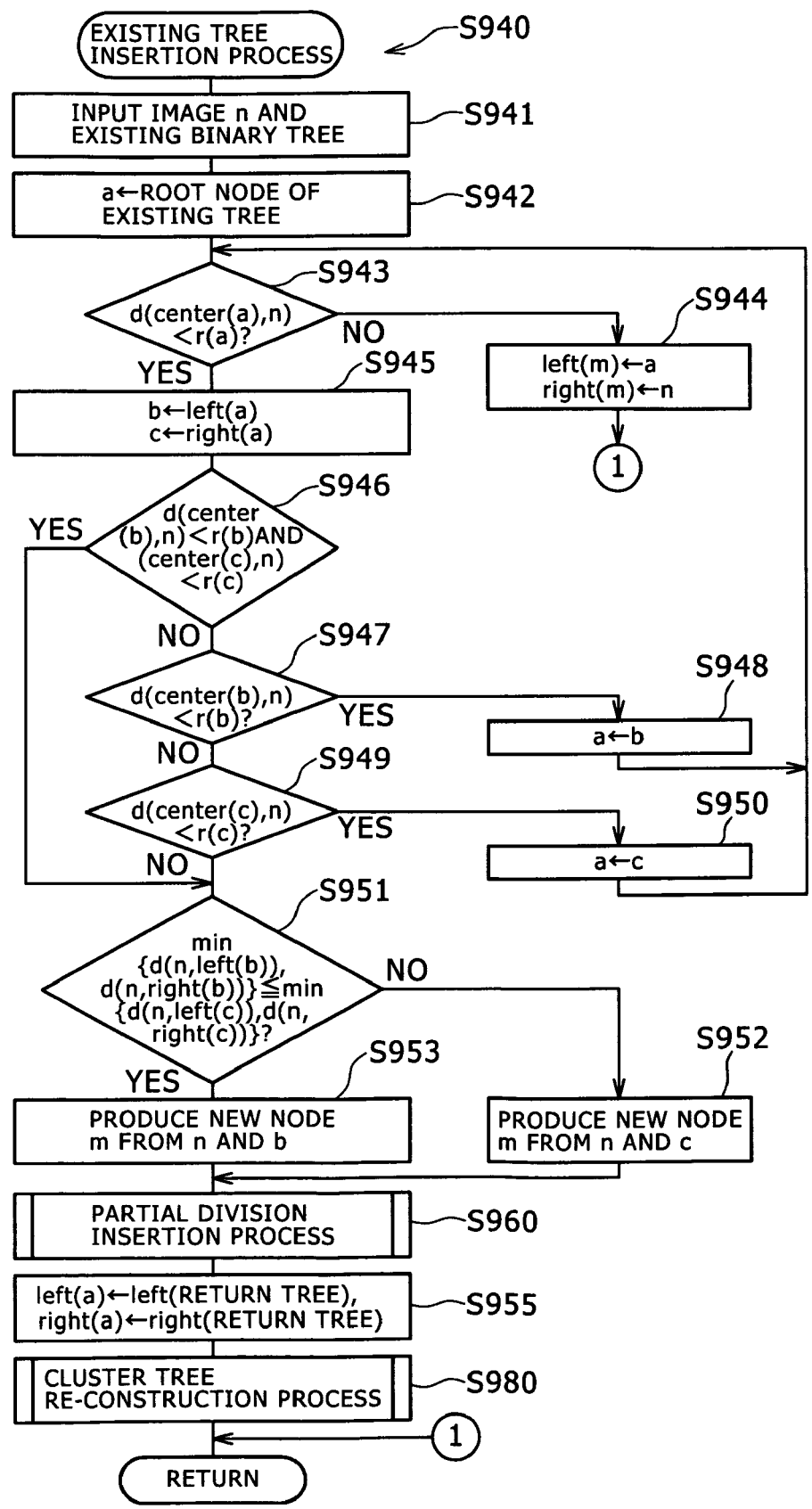
FIG. 41 is a flow chart illustrating an existing tree insertion processing procedure from within the processing procedure of the binary tree production process.

FIG. 41 illustrates an existing tree insertion processing procedure, that is, the processing procedure at step S940 illustrated in FIG. 40, from within the processing procedure of the binary tree production process by the image pickup apparatus 100.

In the present example, the node n corresponding to the image X(i) is inputted and existing binary tree structure data are inputted, and binary tree structure data in which the node n is inserted are outputted.

First, the node n and existing binary tree structure data are inputted at step S941. Then, a node a is set as the root node of the existing binary structure data at step S942. Then, it is decided at step S943 whether or not the node n exists within a sphere of a cluster corresponding to the node a. In other words, it is decided whether or not d(center(a),n)<r(a) is satisfied. Then, if the node n does not exist in the sphere of the cluster corresponding to the root node a at step S943, then a node m which has the root node a and the node n as child nodes thereof is produced at step S944. In other words, the node a is set as the child node left(m) and the node n is set as the child node right(m).

On the other hand, if the node n exists within the sphere of the cluster corresponding to the root node a at step S943, then the two child nodes of the root node a are set as the node b and the node c at step S945. In particular, the node b is set as the child node left(a) and the node c is set as the child node right(a).

Thereafter, it is decided at step S946 whether or not the node n exists in a sphere of a cluster corresponding to the node b and besides the node n exhibits in a sphere of a cluster corresponding to the node c. In other words, it is decided at step S946 whether or not both of d(center(b),n)<r(b) and d(center(c),n)<r(c) are satisfied.

If the node n exists in the sphere of the cluster corresponding to the node b and besides the node n exists in the sphere of the cluster corresponding to the node c at step S946, then the processing advances to step S951. On the other hand, if the node n does not exist in the sphere corresponding to the node b or the node n does not exist in the cluster corresponding to the node c at step S946, then it is decided at step S947 whether or not the node n exists in the sphere of the cluster corresponding to the node b. In particular, it is decided whether or not d(center(b),n)<r(b) is satisfied. If the node n exists in the sphere of the cluster corresponding to the node b at step S947, then the node b is set to the node a at step S948, and then the processes at steps S943 to S947 are repeated. On the other hand, if the node n does not exist in the sphere of the cluster corresponding to the node b at step S947, then it is decided at step S949 whether or not the node n exists in the sphere of the cluster corresponding to the node c. In other words, it is decided whether or not d(center(c),n)<r(c) is satisfied. If the node n exists in the sphere of the cluster corresponding to the node c at step S949 and the node c is set to the node a at step S950, then the processes at steps S943 to S949 are repeated.

On the other hand, if the node n does not exist in the sphere of the cluster corresponding to the node c at step S949, then it is decided at step S951 whether or not min{d(n,left(b)), d(n,right(b))}≦min{d(n,left(c)), d(n,right(c))} is satisfied. In other words, it is decided whether or not the value of a smaller one of the distances between the two child nodes of the node b, that is, the child node left(b) and the child node right(b), and the node n, is lower than the value of a smaller one of the distances between the two child nodes of the node c, that is, the child node left(c) and the right node left(c), and the node n. If it is decided at step S951 that min{d(n,left(b)), d(n,right (b))}≦min{d(n,left(c)), d(n,right(c))} is satisfied, then the node n is inserted between the node b and the node a to produce a new node m from the node n and the node b at step S953. In other words, the child node left(m) is set as the node n and the child node right(m) is set as the node b. The child node left(a) is set as the node m.

On the other hand, conversely if min{d(n,left(b)), d(n,right (b))}>min{d(n,left(c)), d(n,right(c))} is satisfied at step S951, then the node n is inserted between the node c and the node a to produce a new node m from the node n and the node c at step S952. In other words, the child node left(m) is set as the node n, and the child node right(m) is set as the node c. Further, the child node left(a) is set as the node m.

Thereafter, a partial division insertion process is executed at step S960. The partial division insertion process is hereinafter described in detail with reference to FIG. 42.

Thereafter, one of the child nodes of the root node of the binary tree structure data (return tree) produced by the partial division insertion process is replaced by the node a at step S955. In particular, the right (return tree) is set to the child node right(a) and the left (return tree) is set to the child node left(a).

Thereafter, a cluster tree re-construction process is executed at step S980. The cluster tree re-construction process is hereinafter described in detail with reference to FIG. 43.

Figure 42:
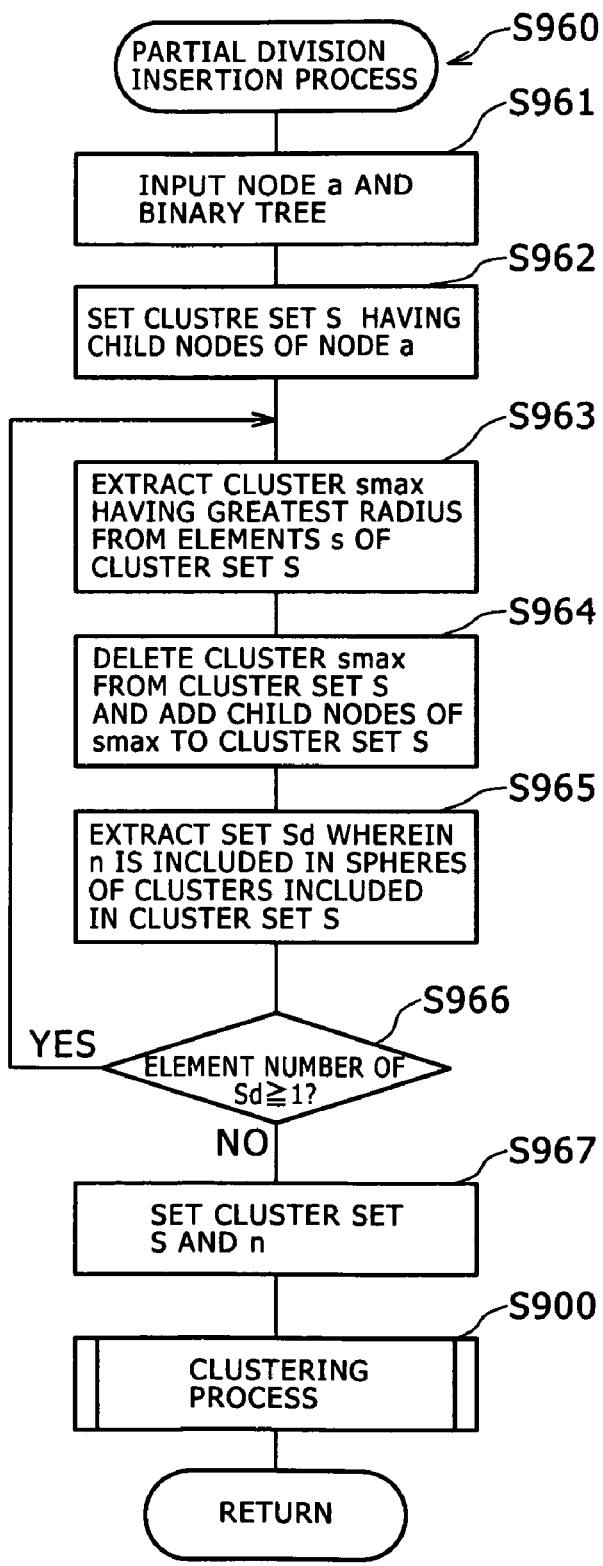
FIG. 42 is a flow chart illustrating a partial division insertion processing procedure from within the processing procedure of the binary tree production process.

FIG. 42 illustrates the partial division insertion process, that is, the processing procedure at step S960 illustrated in FIG. 41, from within the processing procedure of the binary tree production process by the image pickup apparatus 100.

In the example illustrated in FIG. 42, binary tree structure data and the node a are inputted, and modified binary tree structure data are outputted.

First, binary tree structure data and the node a are inputted at step S961.

Then, a cluster set S which includes clusters corresponding to the child nodes of the node a is set at step S962. In other words the cluster set S is set to S=(left(a), right(a)).

Thereafter, a cluster smax which is a cluster having the greatest radius from among elements s of the cluster set S is extracted at step S963. In particular, the cluster smax is represented as smax=argmax(r(s)).

Then, the cluster smax is removed from the cluster set S, and those clusters which correspond to the child nodes of the cluster smax are added to the cluster set S at step S964. In other words, "(S−smax)∪left(smax)∪right(smax)" is set to the cluster set S.

Then, a set in which the node n is included in spheres of clusters included in the cluster set S is set as Sd at step S965. In other words, the cluster set Sd is represented as Sd={Si|d (center(Si), n)<r(Si)}.

Thereafter, it is decided at step S966 whether or not the number of elements of the cluster set Sd is equal to or greater than one. If the number of elements of the cluster set Sd is equal to or greater than one at step S966, then the processing advances to step S963.

On the other hand, if the number of elements of the cluster set Sd is zero at step S966, then the cluster set S and the node n are set as input data at step S967. Then, the clustering process illustrated in FIG. 23 is executed at step S900 to produce binary tree structure data.

Figure 43:
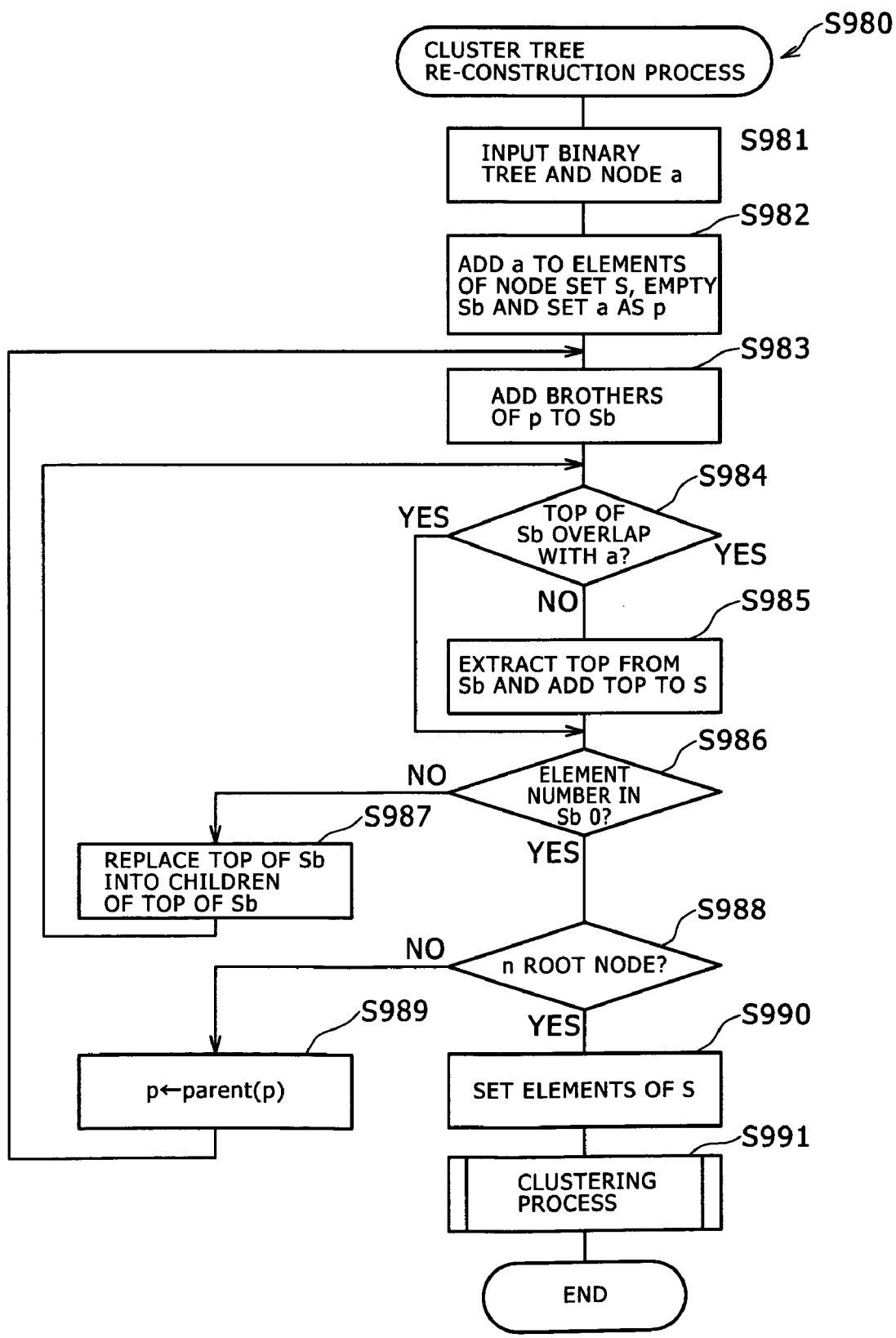
FIG. 43 is a flow chart illustrating a cluster tree re-construction processing procedure from within the processing procedure of the binary tree production process.

FIG. 43 illustrates the cluster tree re-construction processing procedure, that is, the processing procedure at step S980 illustrated in FIG. 41, from within the processing procedure of the binary tree production process by the image pickup apparatus 100.

This cluster tree re-construction process divides the child nodes of the node a so that the brother nodes of the node a may not overlap with the node a to determine a node set Sb and then produces binary tree structure data. Further, in the example described below, binary tree structure data and the node a are inputted, and modified binary tree structure data are outputted.

First, binary tree structure data and the node a are inputted at step S981. Then, the node a is placed into an element of the cluster set S and the node set Sb is emptied and the node a is set as a node p at step S981.

Then, the brother nodes of the node p are added to the node set Sb at step S983. This can be represented as Sb←brother (p)∪Sb.

Thereafter, it is decided at step S984 whether or not the top element of the node set Sb and the node a overlap with each other. In particular, it is decided whether or not d(center(head (Sb)), center(a))>r(head(Sb))+r(a) is satisfied.

Then, if the top element of the node set Sb and the node a do not overlap with each other at step S984, then the top element of the node set Sb is extracted and added to the cluster set S at step S985. In other words, the node set Sb is changed to "Sb−{head(Sb)}", and the cluster set S is changed to "S∪head(Sb)".

Thereafter, it is decided at step S986 whether or not the number of elements of the node set Sb is zero. If the element number of the node set Sb is not zero at step S986, then the top element of the node set Sb is replaced by the top child node of the node set Sb at step S987, and then the processing advances to step S984. In other words, the node set Sb is set to {left (head(Sb)), right(head(Sb))}∪(Sb−{head(Sb)}), and then the processing advances to step S984.

On the other hand, if the number of elements of the node set Sb is zero at step S986, then it is decided at step S988 whether or not the node p is the root node. If the node p is not the root node at step S988, then the parent node of the node p is set to the node p at step S989, and then the processing advances to step S983. In other words, the node parent(p) is set to the node p, and then the processing advances to step S983.

On the other hand, if the node p is the root node at step S988, then the cluster set S is set as input data at step S990 and the clustering process described hereinabove with reference to FIG. 23 is executed at step S991. Consequently, the produced binary tree structure data becomes "return tree", and the processing returns to step S955.

As described above, according to the embodiment of the present invention, binary tree structure data for managing contents including position information are produced by the clustering section 251, and hierarchies of nodes which satisfy predetermined conditions in the produced binary tree structure data are determined by the hierarchy determination section 252. Therefore, contents stored in the pickup image database 230 can be classified.

Further, where an album is to be produced from picked up images picked up, for example, by a digital still camera, since the picked up images can be classified for individual groups determined by the hierarchy determination section 252 based on conditions set by the condition setting section 260, an album conforming to the liking of the user can be produced readily. It is to be noted that, also where contents are to be arranged, since they can be arranged after they are classified for the individual groups determined by the hierarchy determination section 252, it is easy to classify and arrange the contents appropriately.

Further, according to the embodiment of the present invention, since contents are classified based on the density or the number of events of contents included in clusters produced from position information of the contents, there is no necessity to prepare a database for storing place names, events and so forth for classifying the contents based on a known absolute or relative positional relationship on a map. Further, also images picked up at any place on the earth such as a place which does not have a particular characteristic or in the middle of a sea can be classified appropriately in accordance with the liking of the user.

Further, by using a center point and a radius as attribute values of a cluster, whether or not an arbitrary point is included in a cluster can be determined uniquely from the attribute values of the cluster. Therefore, to which cluster a new image which is not clustered as yet should belong can be decided readily based on the attribute values of the clusters. Further, since a certain cluster region is included entirely in a cluster region of the parent cluster thereof and the attribute values, that is, the center point and the radius, of the cluster indicate the range of elements included in the cluster, clusters and elements displayed on the screen can be associated with each other readily.

It is to be noted that, while the grouping conditions described in the embodiment of the present invention are conditions for grouping contents included in clusters based on statistic analysis (cluster density and event number) of the contents, different conditions can be used for the grouping conditions. Further, while, in the embodiment described above, the grouping condition setting bars 121 and 122 are used to vary the parameter constants, it is otherwise possible, for example, to display such preset buttons for "rough", "standard" and "fine" on the display section 120 such that the granularity in grouping is determined in response to selective depression of the preset buttons. Further, it is possible to extract a node in accordance with restrictions and so forth on the UI (User Interface) such as the size of the display screen or the like to determine a group. Further, it is possible to determine the granularity of groups to be displayed in response to the scale of the map.

Further, groups determined in accordance with such grouping conditions as described above may be edited by the user. For example, contents included in clusters corresponding to the individual groups may be displayed in a classified form for the individual groups such that some content may be moved from one to another one of the groups in response to an operation input from the operation acceptance section 130. Further, one or a plurality of contents included in a group may be divided into a plurality of pieces to produce a new group in response to an operation input from the operation acceptance section 130. In this manner, editing based on the liking of the user can be carried out. Further, contents included in clusters corresponding to groups may be displayed in a classified form for the individual groups while information unique to the individual groups is displayed.

The embodiment of the present invention can be applied to an apparatus which has a function of acquiring position information and production time information of contents from the contents or additional data files. For example, the embodiment of the present invention can be applied to an image pickup apparatus such as a digital still camera or a digital video camera, a multimedia content viewer having a built-in storage apparatus, a portable digital assistant which can record, retain and access a content, a content management reading service associated with a map service on a network, application software of a personal computer, a portable game terminal having a photograph data management function, a portable telephone set with a camera having a storage apparatus, a storage apparatus, and a digital home appliance and a game machine which have a photograph data management function. It is to be noted that, although the effect of grouping is exhibited more as the capacity of the storage apparatus increases, the embodiment of the present invention can be applied irrespective of the magnitude of the storage capacity.

Further, while, in the embodiment of the present invention, the clustering object content is described taking a picked up image as an example, the embodiment of the present invention can be applied also to other contents with which position information is associated. For example, the embodiment of the present invention can be applied to contents of photographs, moving pictures, mails, pieces of music, schedules, electronic money use histories, telephone communication histories, content viewing histories, sightseeing information, local information, news, weather forecasts and ring tone mode histories. It is to be noted that a different clustering method may be used in response to the type of the content.

It is to be noted that, while the embodiment of the present invention described above is an example wherein the present invention is carried out and includes features of the invention recited in the claims, the present invention is not limited to the embodiment described above but can be carried out in various modified forms without departing from the spirit and scope of the present invention.

In particular, the content management apparatus in claims 1 to 9 corresponds, for example, to the image pickup apparatus 100. Further, the image display apparatus in claim 10 corresponds, for example, to the image pickup apparatus 100. Furthermore, the image pickup apparatus in claim 11 corresponds, for example, to the image pickup apparatus 100.

The content inputting means in claims 1, 10 and 11 corresponds, for example, to the position information acquisition section 240. The position information acquisition means in claims 1, 10 and 11 corresponds, for example, to the position information acquisition section 240. The tree production means in claims 1, 10 and 11 corresponds, for example, to the clustering section 251.

The determination means in claims 1, 3 to 7, 10 and 11 corresponds, for example, to the hierarchy determination section 252.

The condition setting means in claims 2 and 3 corresponds, for example, to the condition setting section 260.

The operation acceptance means in claim 3 corresponds, for example, to the operation acceptance section 130.

The content outputting means in claim 8 corresponds, for example, to the display control section 290.

The display control means in claims 9 to 11 correspond, for example, to the display control section 290.

The image pickup means in claim 11 corresponds, for example, to the camera section 211.

The content inputting step in claims 12 and 13 corresponds, for example, to the step S911. The position information acquisition step in claims 12 and 13 corresponds, for example, to the step S912. The tree production step in claims 12 and 13 corresponds, for example, to the step S914. The determination step in claims 12 and 13 corresponds, for example, to the step S906.

It is to be noted that the processing procedures described in the description of the embodiment of the present invention may be grasped as a method having the series of procedures or may be programs as a program for causing a computer to execute the series or procedures and a recording medium which stores the program.

It should be understood by those skilled in the art that various modifications, combinations, sub-combinations and alterations may occur depending on design requirements and other factors insofar as they are within the scope of the appended claims or the equivalents thereof.

What is claimed is:

1. A content management apparatus, comprising:
content inputting means for inputting a content with which position information is associated;
position information acquisition means for acquiring the position information associated with the content inputted by said content inputting means;
tree production means for producing binary tree structure data corresponding to a binary tree having leaves to which contents inputted by said content inputting means correspond based on the position information of the contents acquired by said position information acquisition means; and
determination means for extracting a node which satisfies a predetermined condition from among nodes of the binary tree structure data produced by said tree production means and determining those of the contents which belong to the extracted node as one group,
wherein it is successively determined for each of the nodes at the lowest level of the tree whether or not the node satisfies the predetermined condition, and when a given node at the lowest level of the tree does not satisfy the predetermined condition, the apparatus automatically determines whether or not a node immediately above the given node, and coupled to the given node, satisfies the predetermined condition.

2. The content management apparatus according to claim 1, further comprising condition setting means for changeably setting the predetermined condition.

3. The content management apparatus according to claim 2, further comprising operation acceptance means for accepting an operation input, said condition setting means changing the set condition if an operation input to change the predetermined condition is accepted by said operation acceptance means, said determination means extracting the node of the produced binary tree structure data based on the condition changed by said condition setting means.

4. The content management apparatus according to claim 1, wherein the predetermined condition is a parameter constant relating to the density of contents which belong to the node of the binary tree structure data; and
said determination means calculates, for each of the nodes of the binary tree structure data, the density of contents in a cluster region which includes the contents which belong to the node and extracts that one of the nodes with regard to which the calculated density of clusters is included in a predetermined range defined by the parameter constant.

5. The content management apparatus according to claim 4, wherein the parameter constant includes constants indicative of a lower limit value and an upper limit value to the density of clusters, and said determination means extracts those of the nodes with regard to which the calculated density of clusters is included in the range between the lower limit value and the upper limit value.

6. The content management apparatus according to claim 1, wherein the predetermined condition is a parameter constant relating to the number of events of the contents which belong to each of the nodes of the produced binary tree structure data, and said determination means extracts, for each of the nodes of the binary tree structure data, the event number of the contents in a cluster region which includes the contents which belong to the node and extracts that one of the nodes with regard to which the calculated event number of the clusters is included in a predetermined range defined by the parameter constant.

7. The content management apparatus according to claim 6, wherein the parameter constant includes constants indicative of a lower limit value and an upper limit value to the event number of clusters, and said determination means extracts those of the nodes with regard to which the calculated event number of clusters is included in the range between the lower limit value and the upper limit value.

8. The content management apparatus according to claim 1, further comprising content outputting means for classifying and outputting the inputted content based on the determined group.

9. The content management apparatus according to claim 1, wherein the content is an image content, said content management apparatus further comprising display control means for classifying the inputted image content based on the determined group and controlling a display section to display the inputted image content.

10. An image display apparatus, comprising:
content inputting means for inputting an image content with which position information is associated;
position information acquisition means for acquiring the position information associated with the image content inputted by said content inputting means;
tree production means for producing binary tree structure data corresponding to a binary tree having leaves to which image contents inputted by said content inputting means correspond based on the position information of the image contents acquired by said position information acquisition means;
determination means for extracting a node which satisfies a predetermined condition from among nodes of the binary tree structure data produced by said tree production means and determining those of the image contents which belong to the extracted node as one group; and
display control means for classifying the inputted image content based on the determined group and controlling a display means to display the inputted image content,
wherein it is successively determined for each of the nodes at the lowest level of the tree whether or not the node satisfies the predetermined condition, and when a given node at the lowest level of the tree does not satisfy the predetermined condition, the apparatus automatically determines whether or not a node immediately above the given node, and coupled to the given node, satisfies the predetermined condition.

11. An image pickup apparatus, comprising:
image pickup means for picking up an image of an image pickup object;
content inputting means for inputting an image content which corresponds to the image picked up by said image pickup means and with which position information is associated;
position information acquisition means for acquiring the position information associated with the image content inputted by said content inputting means;

tree production means for producing binary tree structure data corresponding to a binary tree having leaves to which image contents inputted by said content inputting means correspond based on the position information of the image contents acquired by said position information acquisition means;

determination means for extracting a node which satisfies a predetermined condition from among nodes of the binary tree structure data produced by said tree production means and determining those of the image contents which belong to the extracted node as one group; and display control means for classifying the inputted image content based on the determined group and controlling a display section to display the inputted image content, wherein it is successively determined for each of the nodes at the lowest level of the tree whether or not the node satisfies the predetermined condition, and when a given node at the lowest level of the tree does not satisfy the predetermined condition, the apparatus automatically determines whether or not a node immediately above the given node, and coupled to the given node, satisfies the predetermined condition.

12. A content management method, comprising the steps of:

inputting a content with which position information is associated;

acquiring the position information associated with the content inputted at the content inputting step;

producing binary tree structure data corresponding to a binary tree having leaves to which contents inputted at the content inputting step correspond based on the position information of the contents acquired at the position information acquisition step; and extracting a node which satisfies a predetermined condition from among nodes of the binary tree structure data produced at the tree production step and determining those of the contents which belong to the extracted node as one group, wherein it is successively determined for each of the nodes at the lowest level of the tree whether or not the node satisfies the predetermined condition, and when a given node at the lowest level of the tree does not satisfy the predetermined condition, it is automatically determined whether or not a node immediately above the given node, and coupled to the given node, satisfies the predetermined condition.

13. A non-transitory computer-readable medium having stored thereon a computer-readable program for causing a computer to execute the steps of:

inputting a content with which position information is associated;

acquiring the position information associated with the content inputted at the content inputting step;

producing binary tree structure data corresponding to a binary tree having leaves to which contents inputted at the content inputting step correspond based on the position information of the contents acquired at the position information acquisition step; and extracting a node which satisfies a predetermined condition from among nodes of the binary tree structure data produced at the tree production step and determining those of the contents which belong to the extracted node as one group, wherein it is successively determined for each of the nodes at the lowest level of the tree whether or not the node satisfies the predetermined condition, and when a given node at the lowest level of the tree does not satisfy the predetermined condition, it is automatically determined whether or not a node immediately above the given node, and coupled to the given node, satisfies the predetermined condition.

* * * * *